United States Patent [19]
Washisu

[11] Patent Number: 6,154,611
[45] Date of Patent: *Nov. 28, 2000

[54] IMAGE-SHAKE COMPENSATION APPARATUS

[75] Inventor: Koichi Washisu, Tokyo, Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/310,852

[22] Filed: May 13, 1999

[30] Foreign Application Priority Data

May 18, 1998 [JP] Japan ................................. 10-151912
Mar. 4, 1999 [JP] Japan ................................. 11-056319

[51] Int. Cl.⁷ ............................................... G03B 17/00

[52] U.S. Cl. ............................................................ 396/55

[58] Field of Search ........................ 396/52–55; 348/208; 359/554–557

[56] References Cited

U.S. PATENT DOCUMENTS

| 5,771,406 | 6/1998 | Sakamoto et al. | 396/55 |
| 5,822,623 | 10/1998 | Urata et al. | 396/52 |
| 5,946,503 | 8/1999 | Washisu | 396/55 |
| 5,978,600 | 11/1999 | Takeuchi et al. | 396/53 |

*Primary Examiner*—W. B. Perkey
*Attorney, Agent, or Firm*—Fitzpatrick, Cella, Harper & Scinto

[57] ABSTRACT

In an image-shake compensation apparatus, a movable unit is driven by a driving unit to provide image shake-compensation and a determination unit determines whether the driving unit is in condition to drive the movable unit. The determination unit inputs a predetermined driving signal to the driving unit for operating the driving unit. Concurrently, the determining unit detects a prescribed electromotive force induced in an electrical conductive section disposed in a magnetic flux which generates a displacement relative to the magnetic flux in response to the movement of the movable unit to perform the determination.

27 Claims, 35 Drawing Sheets

CROSS SECTION ON
LINE 6A-6A IN FIG. 5

VIEW VIEWED IN DIRECTION
SPECIFIED BY ARROW 38 IN FIG. 5

CROSS SECTION ON
LINE 23A-23A IN FIG. 22

VIEW VIEWED IN DIRECTION
SPECIFIED BY ARROW 138 IN FIG. 22

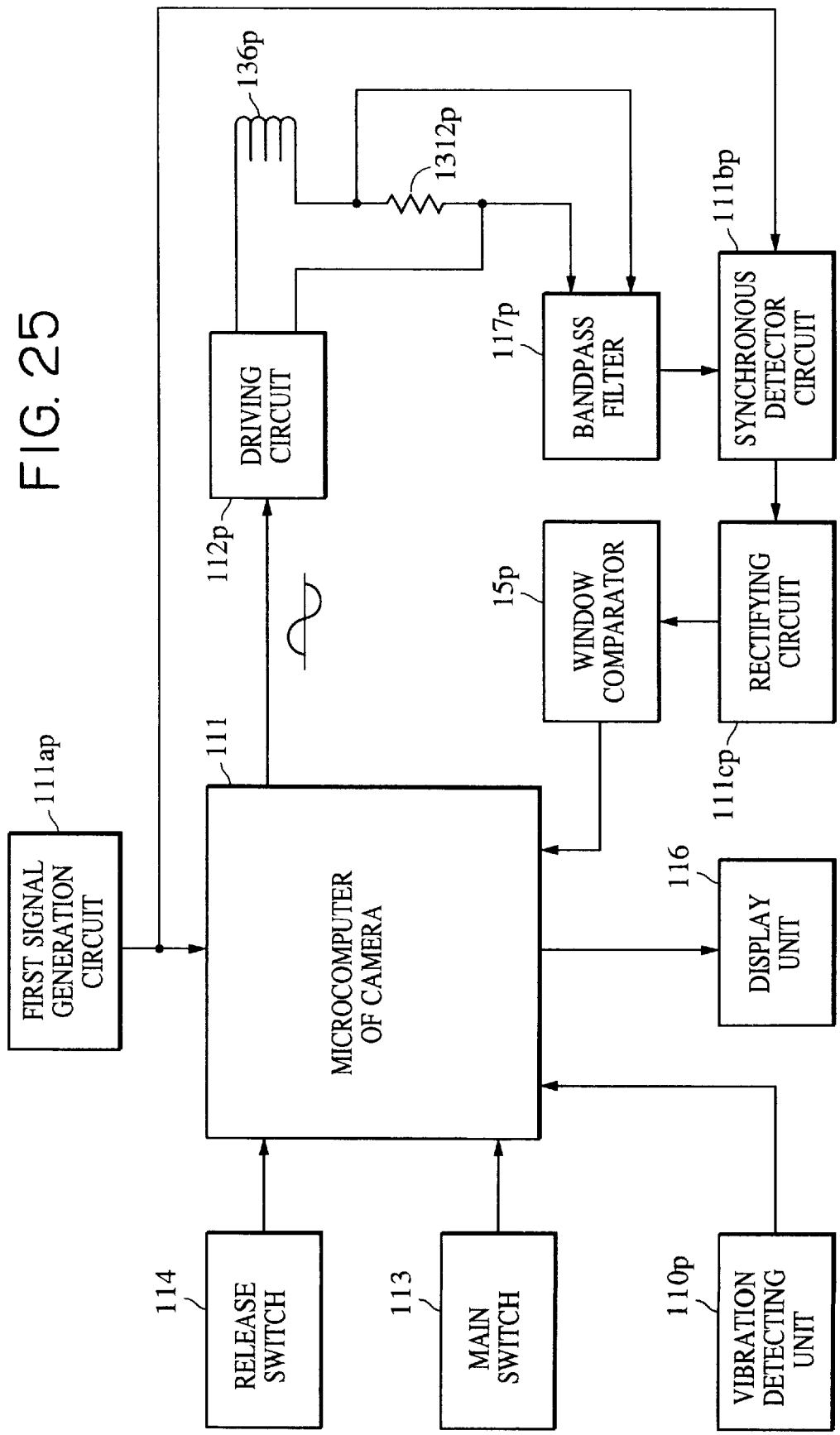

IMAGE-SHAKE COMPENSATION APPARATUS

BACKGROUND OF THE INVENTION

1. Field of the Invention

The present invention relates to an image-shake compensation apparatus for compensating for an image shake caused by a shake of hands or for some reason, in a camera or an optical unit.

2. Description of the Related Art

Since current cameras have been automated in their important operations for taking pictures, such as decisions of exposure and focusing, even persons who are unfamiliar with camera operations are unlikely to fail to take pictures.

In recent years, research has been conducted on systems for preventing shaking of hands applied to the camera from adversely affecting picture taking performance, and there are almost no causes for failure in taking pictures.

A system for preventing shaking of hands applied to the camera from adversely affecting picture taking will be briefly described below.

Shaking of hands applied to the camera when a picture is taken usually provides a vibration having a frequency of 1 to 10 Hz. To allow a picture having no image shaking to be taken even if shaking of hands is applied to the camera when the shutter is released, it is necessary to detect a value for the shaking of the camera caused by the shaking of hands and to displace a compensation lens according to the detected value. Therefore, to take a picture having no image shaking even if a shaking of the camera happens, first the camera shaking needs to be detected correctly and secondly a change in the optical axis caused by a shaking of hands needs to be compensated for.

Such a vibration (a shaking of a camera) can be detected, in principle, by mounting on the camera a shake detecting sensor for detecting acceleration, angular acceleration, angular velocity, or angular displacement, and a vibration detecting unit equipped with a calculation section for applying calculation processing to the output of the shake detecting sensor to compensate for the shaking of the camera. A compensation unit for shifting the optical axis for taking pictures is driven to suppress an image shake according to the detected information.

A vibration preventing system having a vibration detecting unit, a compensation unit, and a driving unit for driving the compensation unit has been disclosed in detail in Japanese Unexamined Patent Publication No. Hei-2-58037. Outlines of the system will be described below by referring to FIGS. 35A and 35B.

FIG. 35A is a perspective view of a compact camera having a vibration preventing system. There is shown a camera cover 61 and an imaging lens 62 of the camera, which is protected by a lens barrier when a picture is not taken (the lens barrier cannot be seen in FIG. 35A because it is retracted for taking pictures). In FIG. 35A, a main switch 63 of the camera is set such that the vibration preventing system is turned on and a picture is ready to be taken. When the main switch 63 is set to a mark OFF, a picture cannot be taken. When the main switch 63 is set to a position 64 which indicates a sports mode (high-speed shutter mode) or to a position 65 which indicates a strobe mode, the vibration preventing system is turned off and a picture can be taken (this is because the vibration preventing system is not required for these modes). When a release button 66 is pressed down, the camera performs light measurement and distance measurement, performs focusing, and then starts shake compensation. Film is exposed. A strobe flash section 67 automatically flashes light when an object is dark, or forcedly flashes light. There is also shown a viewfinder optical system 75 and an eye 76 of the user who is looking through the viewfinder.

FIG. 35B is a perspective view of the inside of the camera shown in FIG. 35A. There is shown a camera body 70, compensation means 68 for driving a compensation optical system 69 freely in X and Y directions shown in the figure to perform shake compensation, and shake detecting sensors 71p and 71y for detecting a shake in a pitch direction 72p and in a yaw direction 72y, respectively. The lens barrier 73, described above, opens and shuts in synchronization with a knob 74. The knob 74 is disposed adjacently to the main switch 63 as shown in FIG. 35A and is pushed to open the lens barrier 73 when the main switch 63 is operated. When the lens barrier 73 is shut, the compensation means 68 (more specifically, a support frame that supports the compensation optical system 69) is mechanically locked to prevent the compensation means 68 from breaking while a picture is not taken, such as while the camera is being carried.

The compensation means 68 shown in FIG. 35B is electromechanically driven with a relationship between a magnet and a coil constituting driving means to perform shake compensation. If the coil is broken due to an external impact or the magnet is damaged, the compensation means 68 cannot be driven. If external foreign matter is attached to the compensation means 68 and its movement is not smooth, successful shake compensation cannot be performed.

In such a case, it is necessary to notify the user in order to have the camera repaired soon since driving for shake compensation cannot be performed. This is especially important for the compact camera, in which the viewfinder optical system 75 is independently provided from an imaging optical system, as shown in FIG. 35A, because it is unclear whether a shake occurs or not even if the user looks through the viewfinder.

Conventional optical units such as cameras cannot detect erroneous operations of compensation units and driving units without impairing their compactness. In other words, erroneous operation of the compensation unit and the driving unit can be detected by providing a position detecting sensor, for example, and by monitoring the output of the position detecting sensor, but the size of the camera and its cost increase, which is not desired.

SUMMARY OF THE INVENTION

Accordingly, it is an object of the present invention to provide an apparatus and camera having a vibration preventing function for accurately detecting erroneous operations of an optical-axis shift unit and of a driving unit for driving the optical-axis shift unit.

Another object of the present invention is to provide an electronic unit for precisely detecting erroneous operations of a driven member and of a driving unit for driving the driven member, at low power consumption.

Still another object of the present invention is to provide an electronic unit for precisely detecting erroneous operations of a driven member and of the driving unit for driving the driven member, at low power consumption without being affected by use conditions and by a difference of apparatuses in which the unit is used.

The foregoing objects are achieved according to the present invention through the provision of an image-shake compensation apparatus including: a movable unit for moving for image-shake compensation; a driving unit for driving the movable unit; and a determination unit for determining whether the driving unit is ready to drive the movable unit, wherein the determination unit inputs a predetermined driving signal for operating the driving unit. At the same time, the present invention detects a certain electromotive force induced on an electrically conductive section which is disposed in a magnetic flux and which generates a displacement relative to the magnetic flux due to the movement of the movable means to perform the determination.

The determination unit may include a unit for determining that the driving unit is ready to drive the movable unit, according to a condition in which the certain electromotive force is induced on the electrically conductive section when the predetermined driving signal is input to the driving unit.

The determination unit may include a unit for determining that the driving unit is not ready to drive the movable unit, according to a condition in which the certain electromotive force is not induced on the electrically conductive section when the predetermined driving signal is input to the driving unit.

Further objects, features and advantages of the present invention will become apparent from the following description of the preferred embodiments with reference to the attached drawings.

BRIEF DESCRIPTION OF THE DRAWINGS

FIG. 25 is a block diagram showing a configuration of a portion related to the error determination of a compact camera according to a ninth embodiment of the present invention.

DESCRIPTION OF THE PREFERRED EMBODIMENTS

Figure 1:
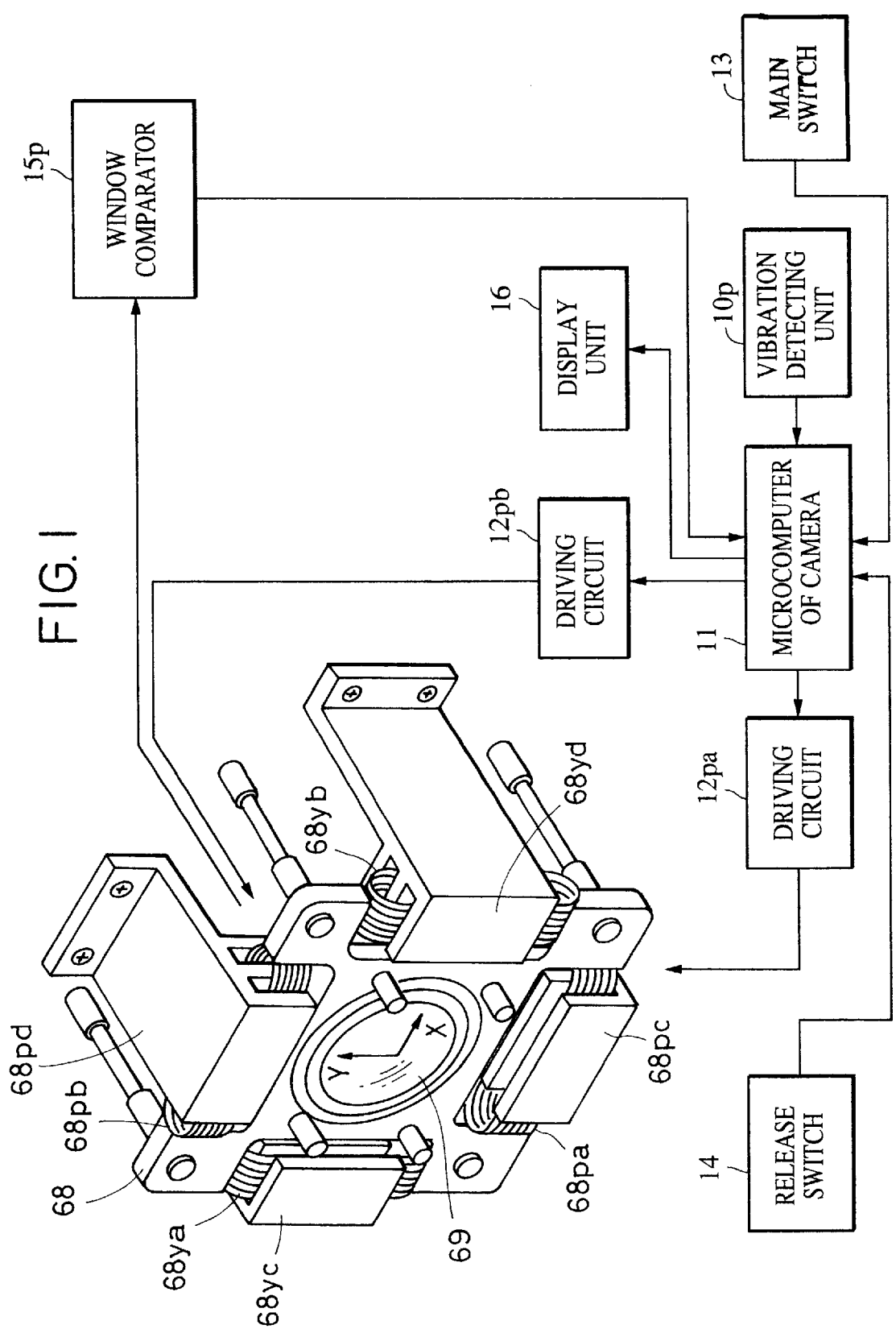
FIG. 1 is a structural view showing a main section of a compact camera according to a first embodiment of the present invention.

The present invention will be described in detail with embodiments shown in the drawings.

First embodiment

FIG. 1 is a structural view of a main section of a compact camera according to a first embodiment of the present invention. It is assumed that the camera includes the compensation unit shown in FIG. 35B. FIG. 1 only shows a system for a vertical shake of the camera (a shake in the Y direction shown in FIG. 35B, which is hereinafter called a shake in the pitch direction). A system for a horizontal shake of the camera (a shake in the X direction shown in FIG. 35B, which is hereinafter called a shake in the yaw direction) has the same structure.

Figure 35A:
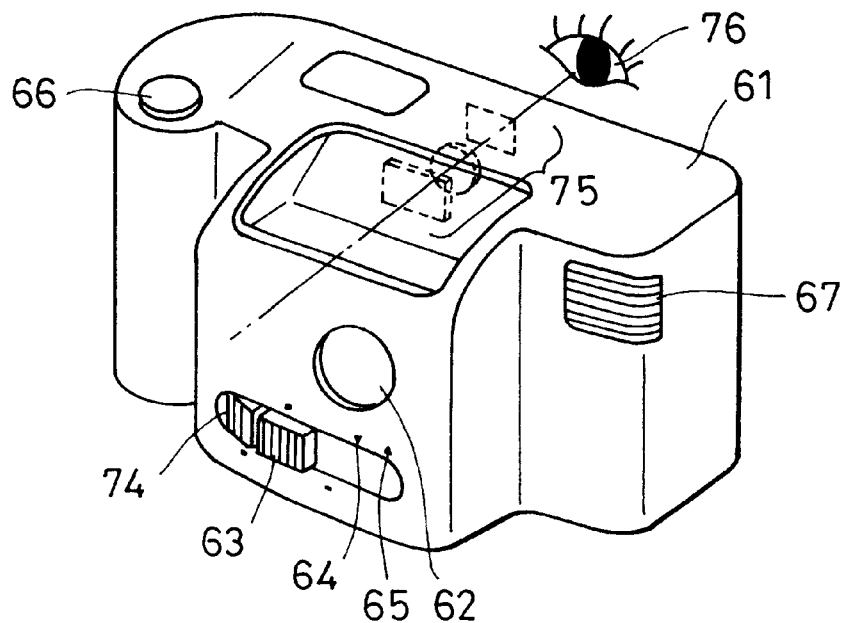
FIGS. 35A and 35B are perspective views showing a structure of a compact camera having a conventional vibration preventing function.
Figure 35B:
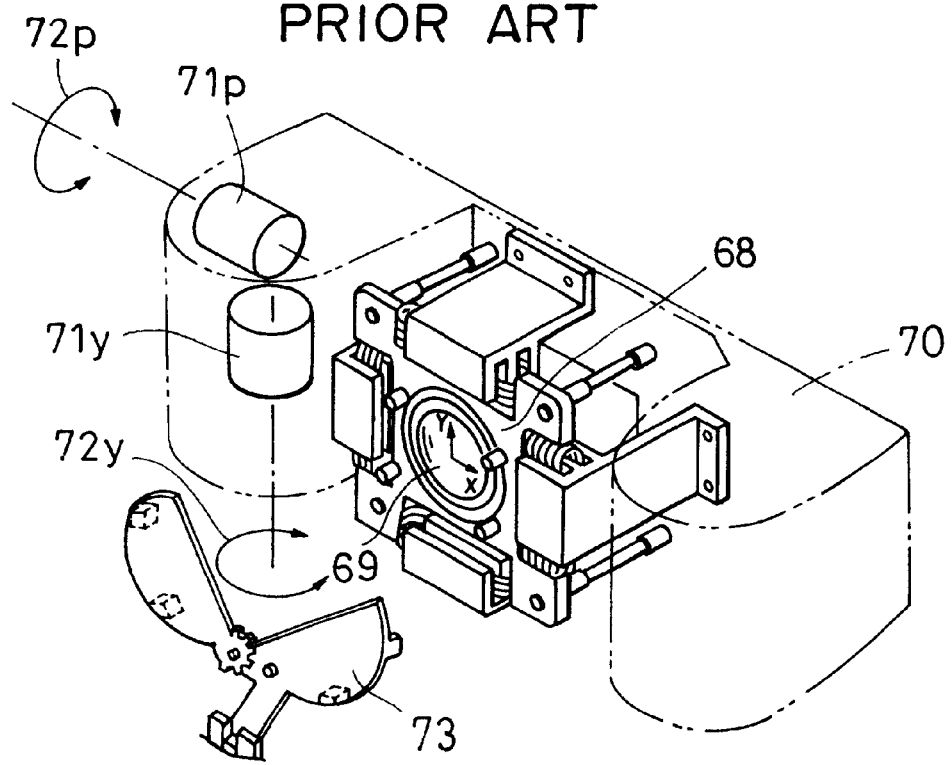

A microcomputer 11 in the camera receives the status signals of a main switch 13 and a release switch 14 of the camera, and a shake signal of a vibration detecting unit 10$p$ provided with the shake detecting sensor 71$p$ shown in FIG. 35B and a calculation section for calculating the output of the sensor.

When the main switch 13 is turned on, the vibration detecting unit 10$p$ starts detecting a shake. A shake signal is input to the microcomputer 11. When the release switch 14 is pressed down (actually, before then, the release switch 14 is half pressed to perform light measurement and distance measurement for an object to be taken), the microcomputer 11 causes a current to flow in coils 68$pa$ and 68$pb$ through driving circuits 12$pa$ and 12$pb$ according to the shake signal sent from the vibration detecting unit 10$p$. Consequently, in cooperation with closed magnetic circuits 68$pc$ and 68$pd$, the coils 68$pa$ and 68$pb$ drive a compensation unit 68 (compensation optical system 69) in the Y direction to perform shake compensation.

Determination (hereinafter also called error determination) of whether the movement of the compensation unit 68 is normal or not before shake compensation will be described below.

When the main switch 13 is turned on, the microcomputer 11 supplies a predetermined current to the coil 68$pa$ through the driving circuit 12$pa$ before the microcomputer performs actual shake compensation. The driving circuit 12$pb$ is turned off in advance. When the current flows through the coil 68$pa$, the compensation unit 68 is normally driven in the Y direction and electromotive force is generated in the coil 68$pb$ due to its relation to the closed magnetic circuit 68$pd$. If the compensation unit 68 cannot be moved due to a damage of a component caused by an external impact, or if the coil 68$pb$ is broken, this electromotive force is not generated. The electromotive force is not generated if the coil 68$pa$ is broken, because the compensation unit 68 is not moved.

When the microcomputer 11 supplies the current to the coil 68$pa$, it determines whether the electromotive force is generated in the coil 68$pb$ by whether a signal is generated at a window comparator 15$p$ for comparing the output of the coil 68$pb$ with a predetermined value. If the signal is not generated (the electromotive force is not generated), in other words, if it is determined that the compensation unit 68 is not normally operated, a display unit 16 is driven to notify the condition to the user by sound or display.

Figure 2:
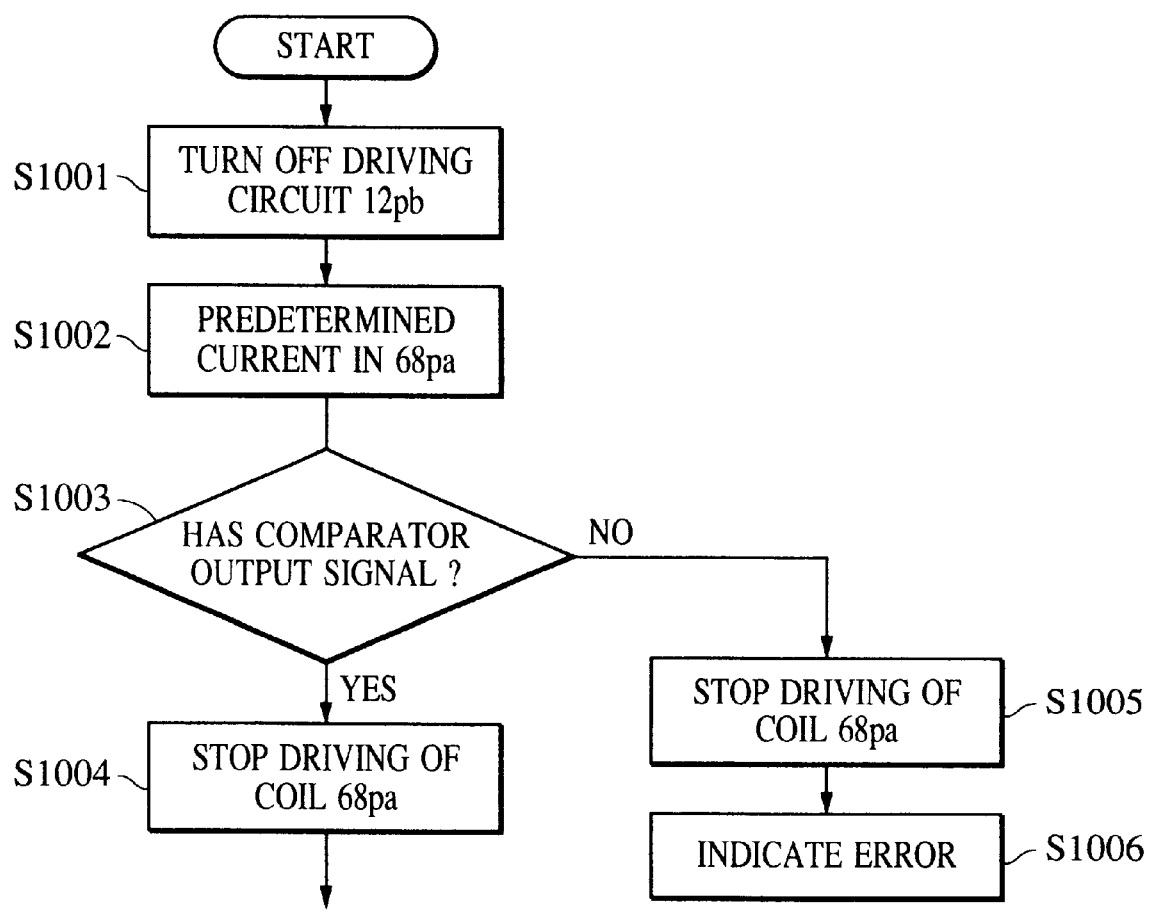
FIG. 2 is a flowchart showing operations of a portion related to the error determination of a compensation means in the compact camera according to the first embodiment of the present invention.

FIG. 2 is a flowchart indicating operations of the microcomputer 11, only for determining the status of the compensation unit 68. By referring to the figure, the operations will be described below.

When the main switch 13 is turned on, the microcomputer 11 starts the operations shown in FIG. 2. In a step S1001, the driving circuit 12$pb$ for detecting the electromotive force is turned off (otherwise the electromotive force is not generated). In the next step S1002, a predetermined current flows into the coil 68$pa$ to make an attempt to drive the compensation unit 68. In the next step S1003, the state of the output signal of the window comparator 15$p$ is determined. When the signal is input to the microcomputer 11, since this means that the compensation unit 68 can operate normally, the procedure proceeds to a step S1004. The current flowing into the coil 68$pa$ (driving of the coil 68$pa$) is stopped and the procedure returns to a usual camera sequence.

On the other hand, when it is determined from the output signal of the window comparator 15$p$ that the compensation unit 68 cannot move normally, the procedure proceeds to a step S1005. The current flowing into the coil 68$pa$ is stopped. In the following step S1006, the display unit 16 is driven to notify the condition to the user.

As described above, since error determination for the compensation unit 68 is performed by a current flowing into one coil 68$pa$ to drive the compensation means 68 prior to shake compensation and by determining whether electromotive force (counter electromotive force) induced in the other coil 68$pb$ (this coil is also used for shake compensation in the pitch direction in usual shake compensation) is generated, a much simpler structure is provided compared with a method in which a position detecting sensor is disposed and its movement is monitored.

To further describe details, relatively large precision units such as single-lens reflex cameras are provided with a position detecting sensor for monitoring the movement of compensation unit, and error determination can be performed with the use of the position detecting sensor. Conversely, compact, inexpensive precision units such as compact cameras do not have a position detecting sensor, which increases the scale and cost of the units, and there is conventionally no method for performing error determination of compensation means in such units. With the above structure, error determination can be easily provided without increasing the scale and cost of the units. This is an enormous advantage.

The above error determination is performed with the compensation unit 68 being driven in the Y direction. The compensation unit 68 may be driven in the X direction at the same time or at another timing to perform error determination (measurement of electromotive force induced in a coil 68yb by a current flowing through a coil 68ya) in the direction.

The electromotive force is sent from the coil 68pb to the window comparator 15p. It may be configured such that the electromotive force itself is converted to a digital signal, the signal is sent to the microcomputer, and the microcomputer performs the determination.

Second embodiment

Figure 3:
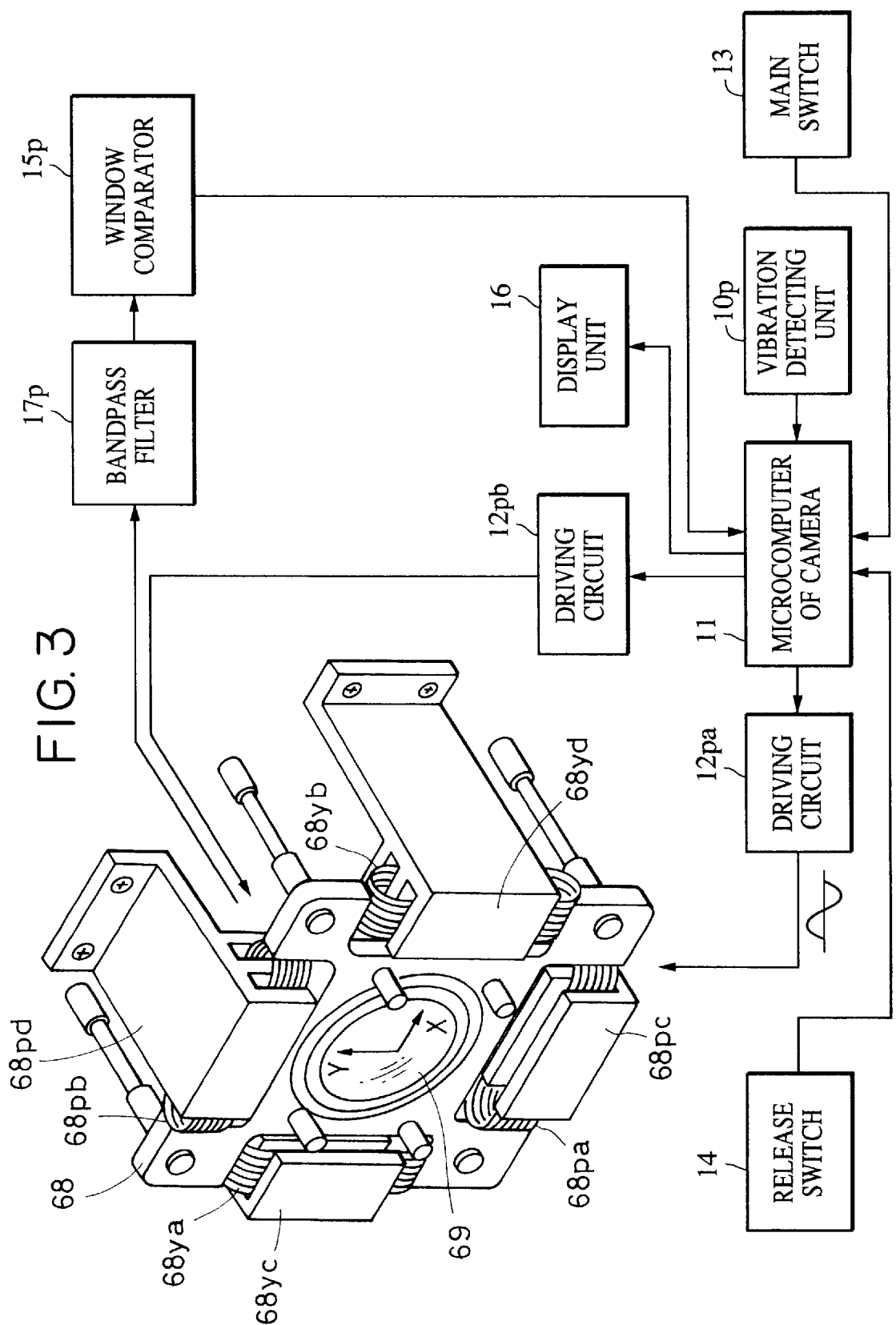
FIG. 3 is a structural view showing a main section of a compact camera according to a second embodiment of the present invention.

FIG. 3 is a structural view of a main section of a compact camera according to a second embodiment of the present invention. The same symbols as those in FIG. 1 are assigned to the same portions, and descriptions thereof will be omitted.

This embodiment differs from the first embodiment in that an alternating current is supplied to a coil 68pa to vibrate compensation means 68 in error determination, and a bandpass filter 17p is disposed between a window comparator 15p and a coil 68pb at an electromotive-force detecting side to remove signals having frequencies other than the vibration frequency.

Figure 4:
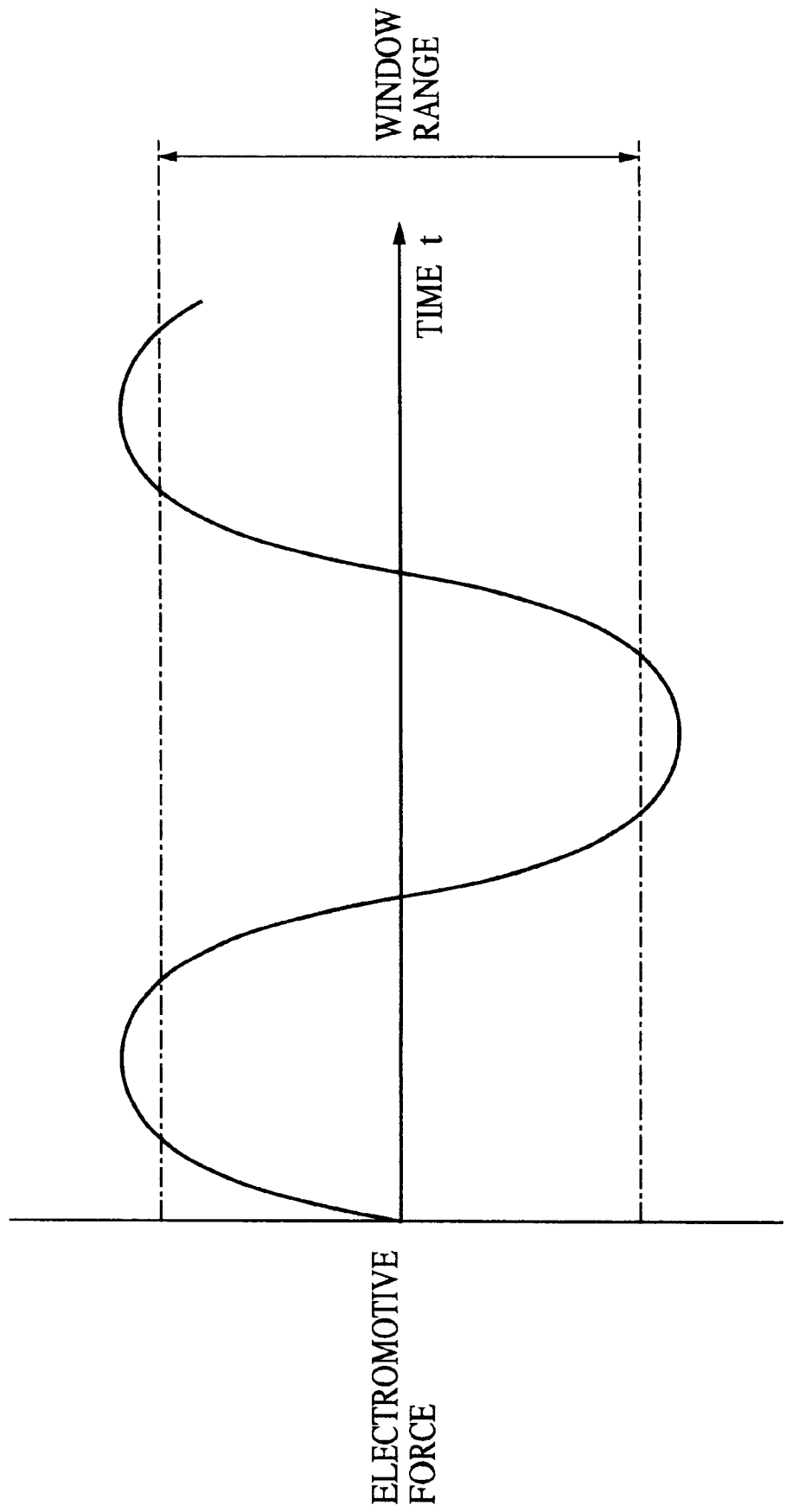
FIG. 4 is a view showing the output signal of a window comparator shown in FIG. 3.

With this configuration, noise superposed on the electromotive force induced in the coil 68pb is removed by the band-pass filter 17p. As shown in FIG. 4, the window comparator 15p outputs a signal to a microcomputer 11 to indicate that the compensation means 68 operates normally when the input alternating signal exceeds a predetermined range.

With this configuration, noise on the coil 68pb is removed to enhance the reliability of error determination.

Third embodiment

Figure 5:
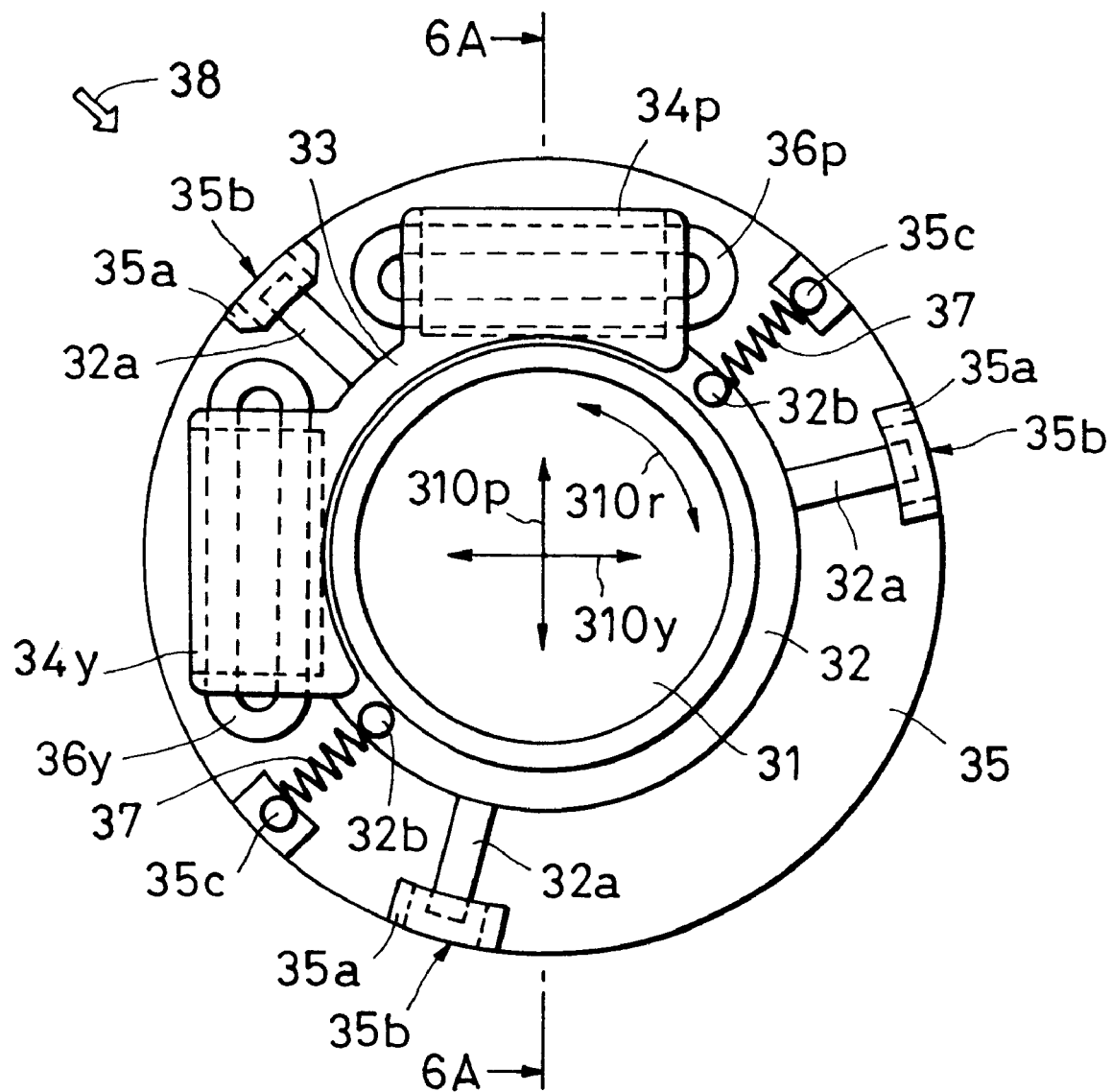
FIG. 5 is an elevation of the compensation means in the compact camera according to the first embodiment of the present invention.
Figure 6A:
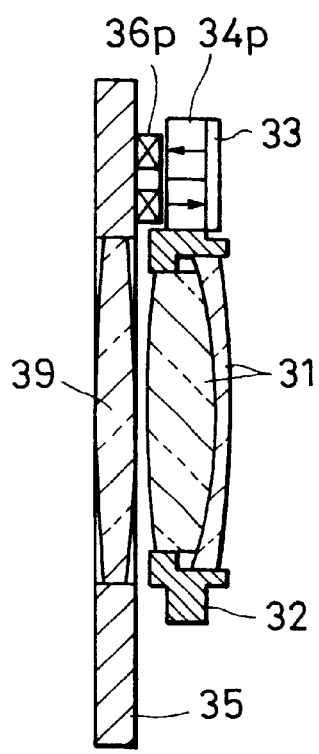
FIG. 6A is a cross section on line 6A—6A in FIG. 5.
Figure 6B:
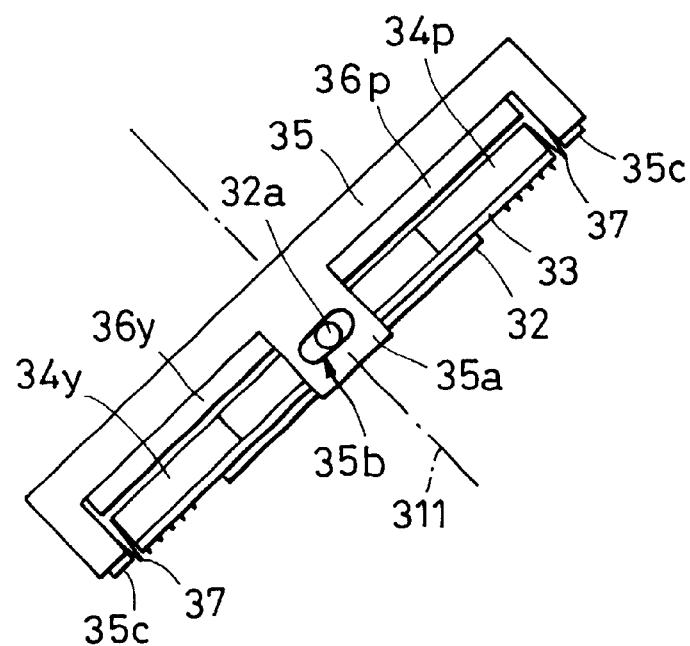
FIG. 6B is a view showing a state viewed in the direction specified by an arrow 38 in FIG. 5.
Figure 7:
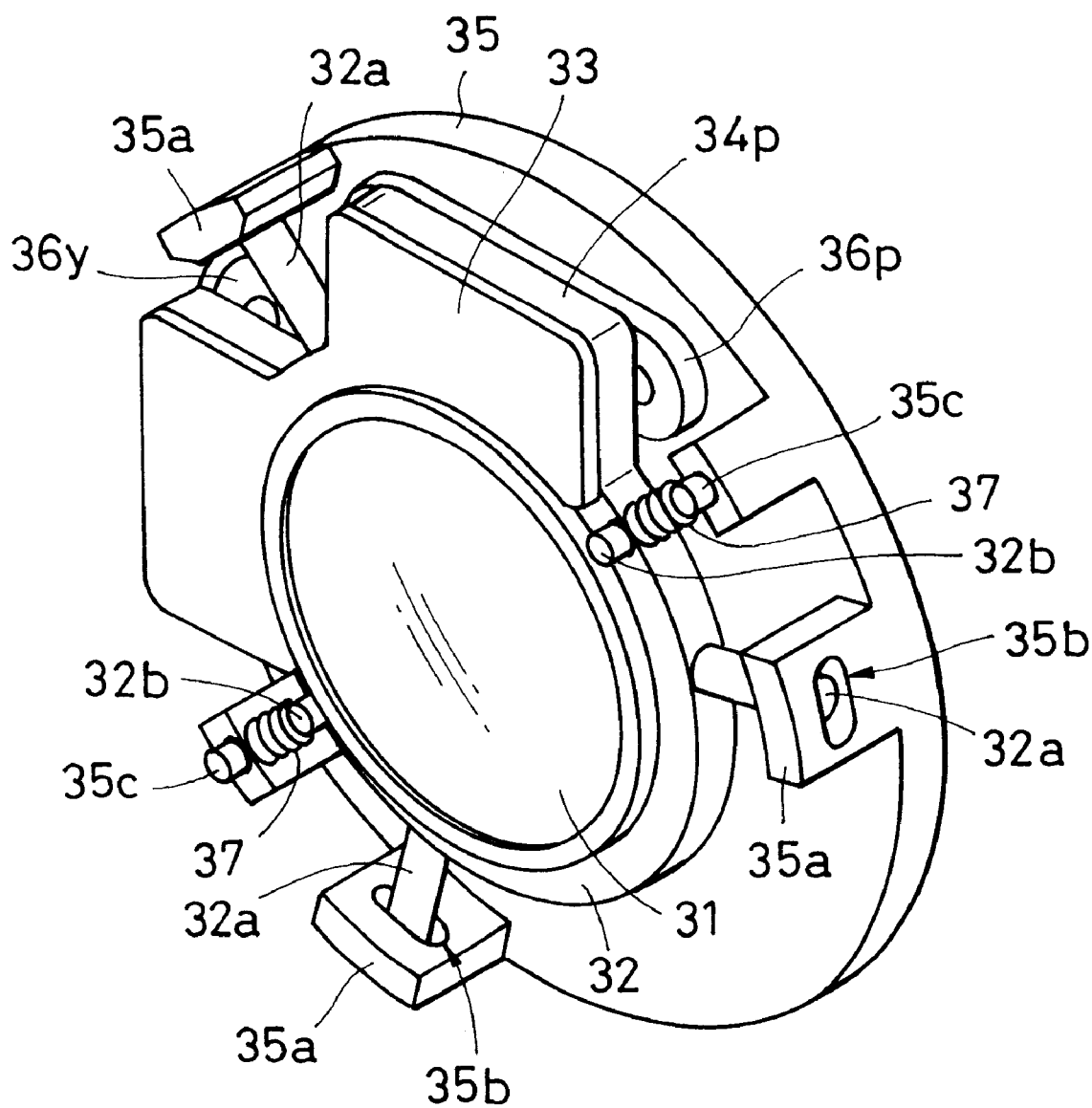
FIG. 7 is a perspective view of the compensation means shown in FIG. 5.

FIGS. 5–7 are views showing a structure of compensation means according to a third embodiment of the present invention. FIG. 5 is an elevation of the compensation unit. FIG. 6A is a cross section on line 6A—6A in FIG. 5. FIG. 6B is a view viewed in the direction specified by an arrow 38 in FIG. 5. FIG. 7 is a perspective view of the compensation unit shown in FIG. 5.

As shown in FIG. 6A, a compensation lens 31 is formed of two lenses secured to a support frame 32 and constitutes a group of an imaging optical system together with a lens 39 secured to a base plate 35. A yoke 33 made from a ferromagnetic material is mounted on the support frame 32. At the rear side of the yoke 33, permanent magnets made from neodymium are secured (shown in FIG. 5 by hidden lines). Three pins 32a extending radially from the support frame 32 are engaged in oblong holes 35b provided for side walls 35a of the base plate 35.

As shown in FIG. 6B and FIG. 7, the pins 32a and the oblong holes 35b are engaged in the optical-axis direction of the compensation lens 31 with no play. The oblong holes 35b extend in directions perpendicular to the optical axis. Therefore, the support frame 32 does not move in the optical-axis direction 311 against the base plate 35, but can move freely in a plane (directions specified by arrows 310p, 310y, and 310r in FIG. 5) perpendicular to the optical axis. Since pulling springs 37 are hooked between hooks 32b on the support frame 32 and hooks 35c on the base plate, the movement of the support frame 32 is elastically restricted in each direction (310p, 310y, and 310r). Coils 36p and 36y are mounted on the base plate 35 opposite the permanent magnets 34p and 34y.

The yoke 33, the permanent magnet 34p and the coil 36p are disposed as shown in FIG. 6A (the permanent magnet 34y and the coil 36y are disposed in the same way). When a current flows into the coil 36p, the support frame 32 is driven in the direction specified by the arrow 310p. When a current flows into the coil 36y, the support frame 32 is driven in the direction specified by the arrow 310y. The distances of the movements are determined according to balance between the spring constants of the pulling springs 37 in the directions and the thrusts generated by the relationships between the coils 36p and 36y and the permanent magnets 34p and 34y. In other words, according to the amount of currents flowing into the coils 36p and 36y, the amount of shifting of the compensation lens 31 can be controlled.

Figure 8:
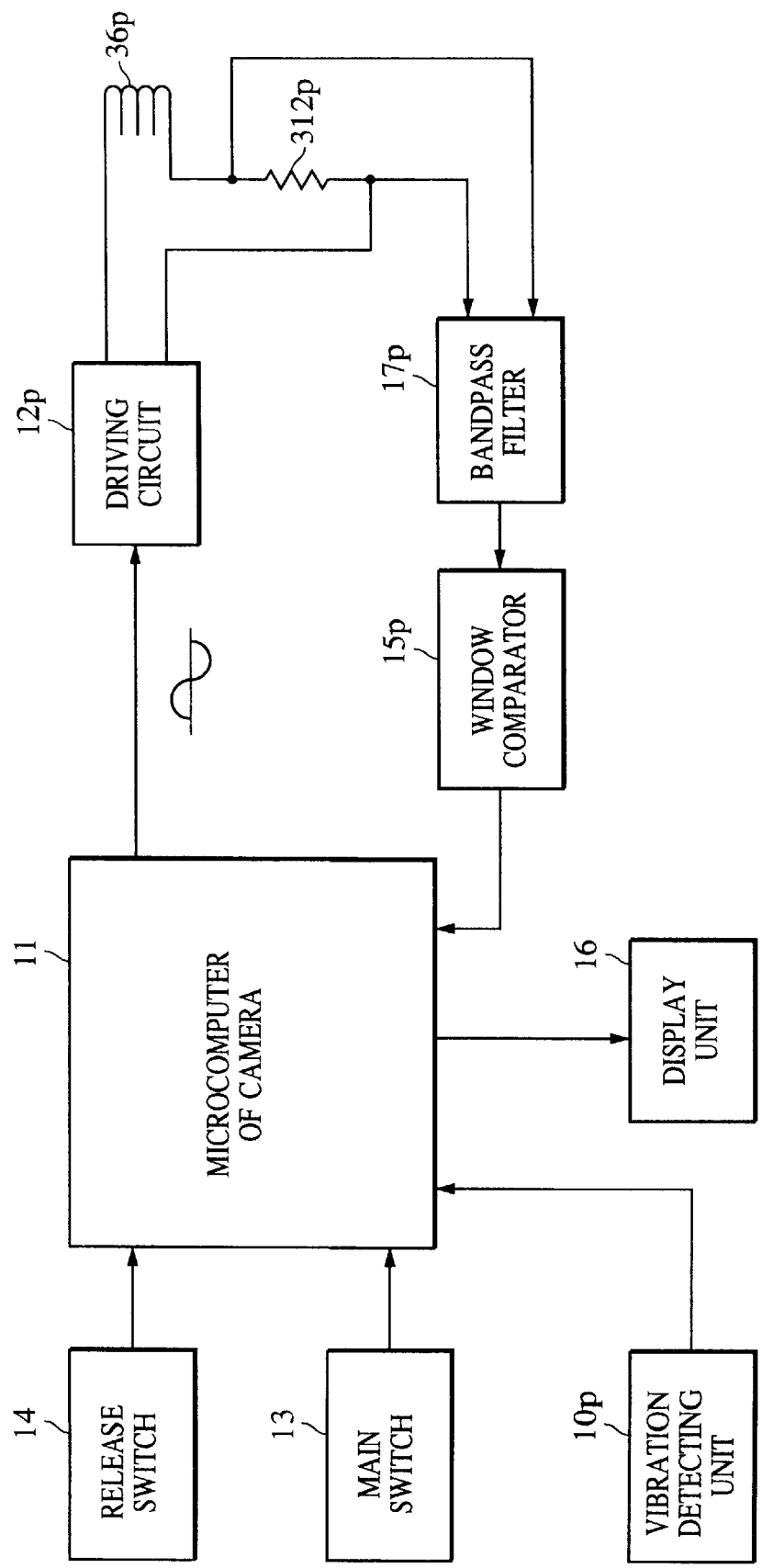
FIG. 8 is a block diagram showing a configuration of a portion related to the error determination of a compact camera according to a third embodiment of the present invention.

FIG. 8 is a block diagram showing a circuit configuration of a portion that performs error determination in a compact camera equipped with the compensation unit having the above structure. It shows only a portion that performs error determination for one axis (in the direction specified by the arrow 310p). A portion that performs error determination for the other axis (in the direction specified by the arrow 310y) has the same configuration.

The configuration shown in FIG. 8 differs from that shown in FIG. 3 in that a resistor 312p (constant resistor) having a constant resistance is connected in series to a coil 36p and a voltage across the resistor 312p is input to a bandpass filter 17p.

Assuming that the coil 36p has a resistance of 20 Ω, the resistance of the resistor 312p is set to about 1 Ω. About $\frac{1}{21}$ of the voltage applied from a driving circuit 12p to the coil 36p appears across the resistor 312p. "About $\frac{1}{21}$" indicates that the voltage across the resistor 312p varies according to the frequency of the voltage applied to the coil 36p.

Figure 9A:
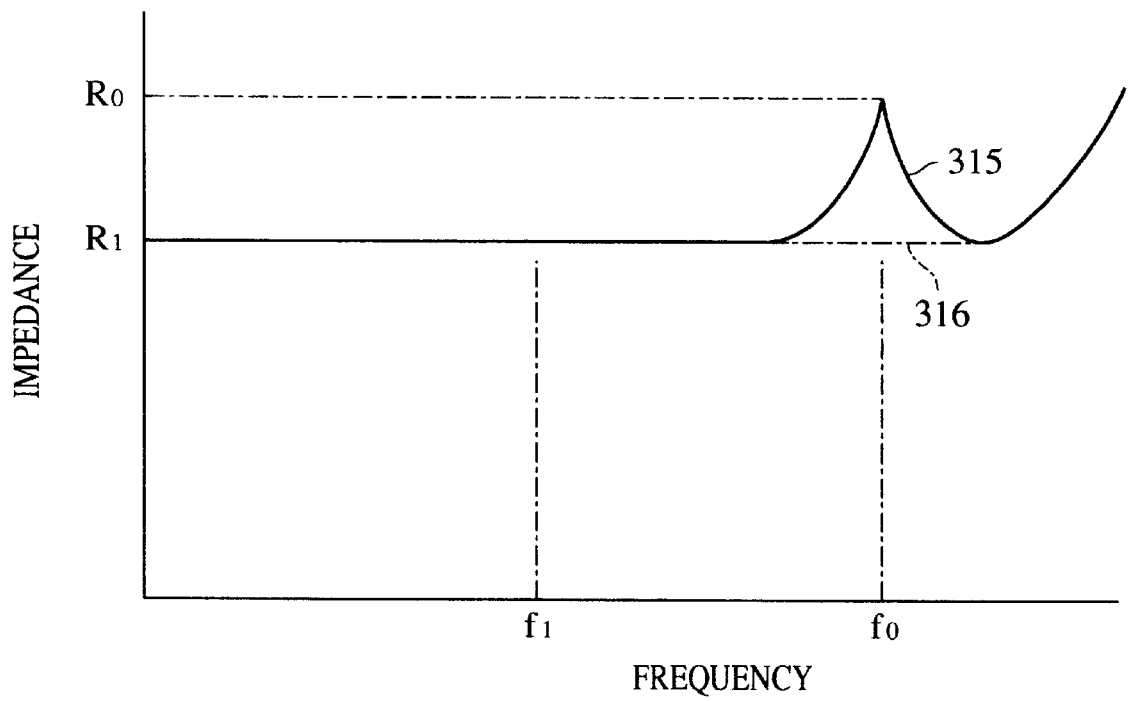
FIG. 9A is a view showing a change in impedance of a coil shown in FIG. 8 when a current flows into the coil.

FIG. 9A shows the relationship between the frequency (horizontal axis) of the voltage applied to the coil 36p and the impedance (vertical axis) of the coil 36p. The impedance becomes high at the natural frequency $f_0$ obtained by the spring constant of a pulling spring 37 and the mass of the compensation means (see a waveform 315). This is because the compensation unit largely vibrates at the natural frequency $f_0$ due to resonance and thereby a large counter electromotive force is generated. The impedance of the coil 36p becomes high at the higher frequency side because of the inductance of the coil 36p.

If the compensation unit is broken and cannot be moved, since resonance is not generated even if the compensation means is driven, the impedance does not become high at the natural frequency (waveform 316).

Figure 9B:
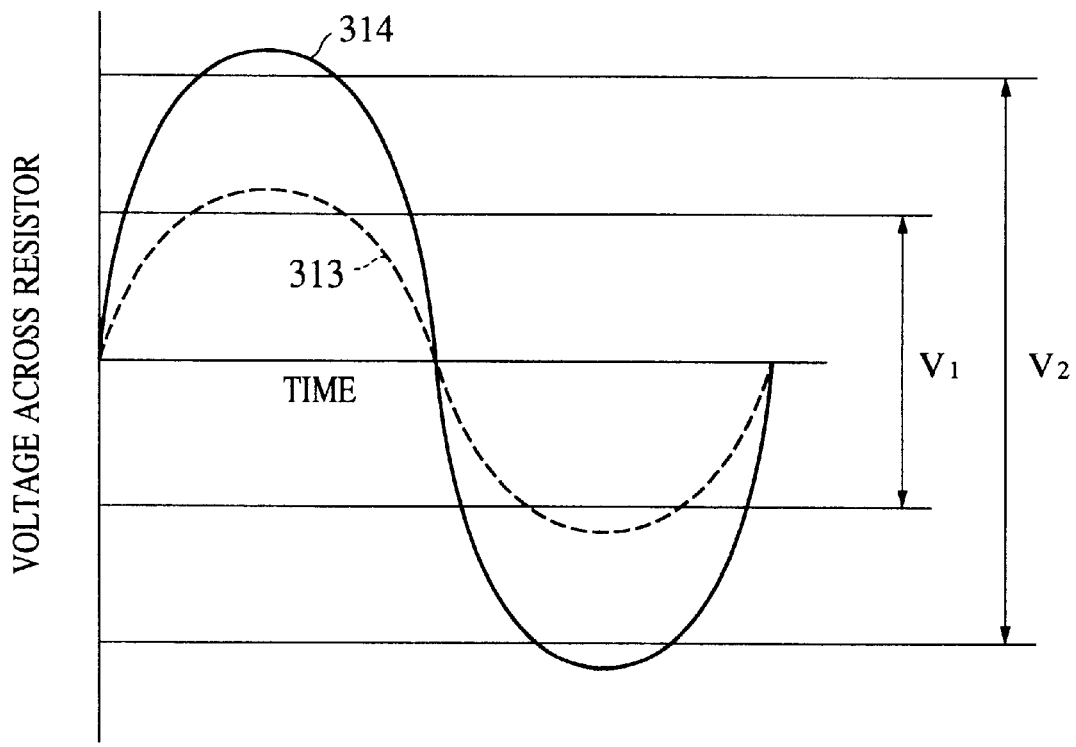
FIG. 9B is a view showing the voltage across a resistor when a current flows into the coil.

In the block diagram shown in FIG. 8, when a voltage having a natural frequency of $f_0$ is applied to the coil 36p before shake compensation is started, the voltage generated across the resistor 312p has a waveform 313 shown in FIG. 9B. If the compensation unit is broken, since the impedance of the coil 36p becomes lower, the voltage across resistor 312p has a large amplitude as shown by a waveform 314.

Noise is removed by the bandpass filter 17p, which passes only signals having frequencies in the vicinity of the natural frequency $f_0$. With the output of a window comparator 15p, error determination is performed. More specifically, from the output of the window comparator 15p, when it is found that the peak voltage across the resistor 312p exceeds a range $V_2$ in FIG. 9B, it is determined that the compensation means is not operating. When it is found that the peak voltage is within a range $V_1$, it is determined that the coil 36p is broken. In either of these cases, the microcomputer determines that an error occurs, and drives a display unit 16 to notify the condition to the user. On the other hand, when the peak voltage across the resistor 312p falls between the range $V_1$ and the range $V_2$, it is determined that the compensation means can operate normally, and the procedure proceeds to the usual camera sequence.

Figure 10:
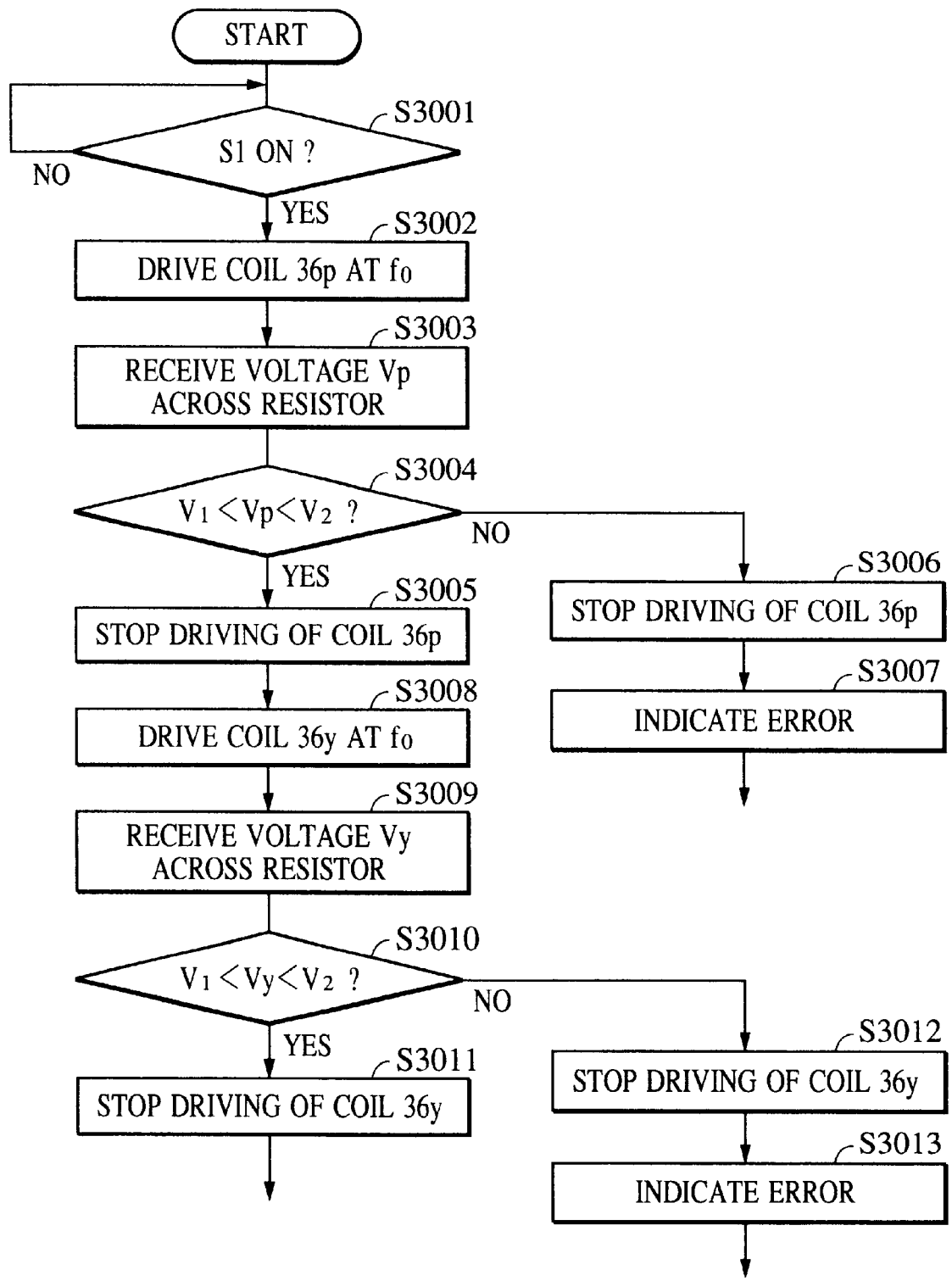
FIG. 10 is a flowchart showing operations of a portion related to the error determination of a compensation means in the compact camera according to the third embodiment of the present invention.

FIG. 10 is a flowchart showing operations of a portion that determines the status of the compensation unit in the microcomputer 11 of the camera according to the third embodiment of the present invention.

When a main switch 13 is turned on, the microcomputer 11 starts the operations shown in FIG. 10. In a step S3001, a release button 14 is half pressed and the microcomputer 11 waits until a switch S1 is turned on. When the switch S1 is turned on, the procedure proceeds to a step S3002. A voltage having the natural frequency $f_0$ is applied to the coil 36p and the compensation unit is vibrated in the direction specified by the arrow 310p in FIG. 5.

In the next step S3003, the peak voltage Vp generated across the resistor 312p is received through the bandpass filter 17p and the window comparator 15p. In the next step S3004, it is determined from the output of the window comparator 15p whether the peak voltage Vp across the resistor 312p falls in a predetermined range ($V_1 < Vp < V_2$). If the peak voltage does not fall in the range, the movement of the compensation means is erroneous. The procedure proceeds to a step S3006. Driving of the coil 36p is stopped. In the next step S3007, the display unit 16 is driven to notify the condition to the user.

On the other hand, when it is determined that the peak voltage Vp across the resistor 312p falls in the predetermined range ($V_1 < Vp < V_2$), the procedure proceeds to a step S3005. Driving of the coil 36p is stopped. In the next step S3008, a voltage having the natural frequency $f_0$ is applied to the coil 36y and the compensation unit is vibrated in the direction specified by the arrow 310y. In the next step S3009, the peak voltage Vy generated across a resistor 312y not shown is received through a bandpass filter 17y and a window comparator 15y not shown.

In the next step S3010, it is determined from the output of the window comparator 15y whether the peak voltage Vy across the resistor 312y falls in the predetermined range ($V_1 < Vy < V_2$). If the peak voltage does not fall in the range, the movement of the compensation unit is erroneous. The procedure proceeds to a step S3012. Driving of the coil 36y is stopped. In the next step S3013, the display unit 16 is driven to notify the condition to the user. On the other hand, when it is determined that the peak voltage Vy across the resistor 312y falls in the predetermined range ($V_1 < Vp < V_2$), the procedure proceeds to a step S3011. Driving of the coil 36y is stopped and the procedure proceeds to the usual camera sequence.

In the above flow, driving of the coil 36p and that of the coil 36y are performed with a time difference, not at the same time, to avoid driving interference in two directions caused by simultaneous driving. Driving of both coils is not necessarily required. Error determination is possible only with driving of one coil.

In this flow, when the switch S1 is turned on, an error determination operation starts. Actually, light measurement and distance measurement are also performed when the switch S1 is turned on. An error determination operation may be performed prior to the light measurement and the distance measurement or after them. When vibration is not prevented, an error determination operation may be omitted.

As in the first and second embodiments, an error determination operation may be started when the main switch 13 of the camera is turned on.

The coils 36p and 36y are actually driven for, for example, about 0.1 seconds, and these operations do not excite an unpleasant feeling in the user.

In the third embodiment, attention is paid to the condition in which the impedance of the coil 36p (36y) largely changes depending on whether the compensation unit operates normally when a voltage having the natural frequency $f_0$ is applied to the coil 36p (36y). The resistor 312p (312y) is provided for detecting a change of the impedance, and the error determination of the compensation means is performed by measuring the voltage generated across the resistor 312p (312y).

Therefore, in cameras made further compact by not having two coils (for driving in the pitch and yaw directions), which are provided in the first and second embodiments, the error determination of the compensation means can be positively performed without increasing the scale and cost of the cameras.

Since the compensation unit is vibrated at the natural frequency $f_0$, obtained by the spring constant of a pulling spring 37 and the mass of the compensation means, a large change in impedance can be measured by flowing a low current into the coil.

Fourth embodiment

In the third embodiment, the compensation means is driven at the natural frequency to measure the voltage across the resistor. In a fourth embodiment of the present invention, in addition to this voltage, the voltage across the resistor is obtained when the compensation unit is driven at a frequency equal to or lower than the natural frequency, and error determination is performed with the relationship between the voltages.

The voltage generated across the resistor changes according to conditions (temperature and the posture of the camera) obtained when a picture is taken. With the use of the relative relationship between the two voltage levels, the effect of the conditions obtained when a picture is taken becomes small and highly reliable error determination is performed.

Figure 11:
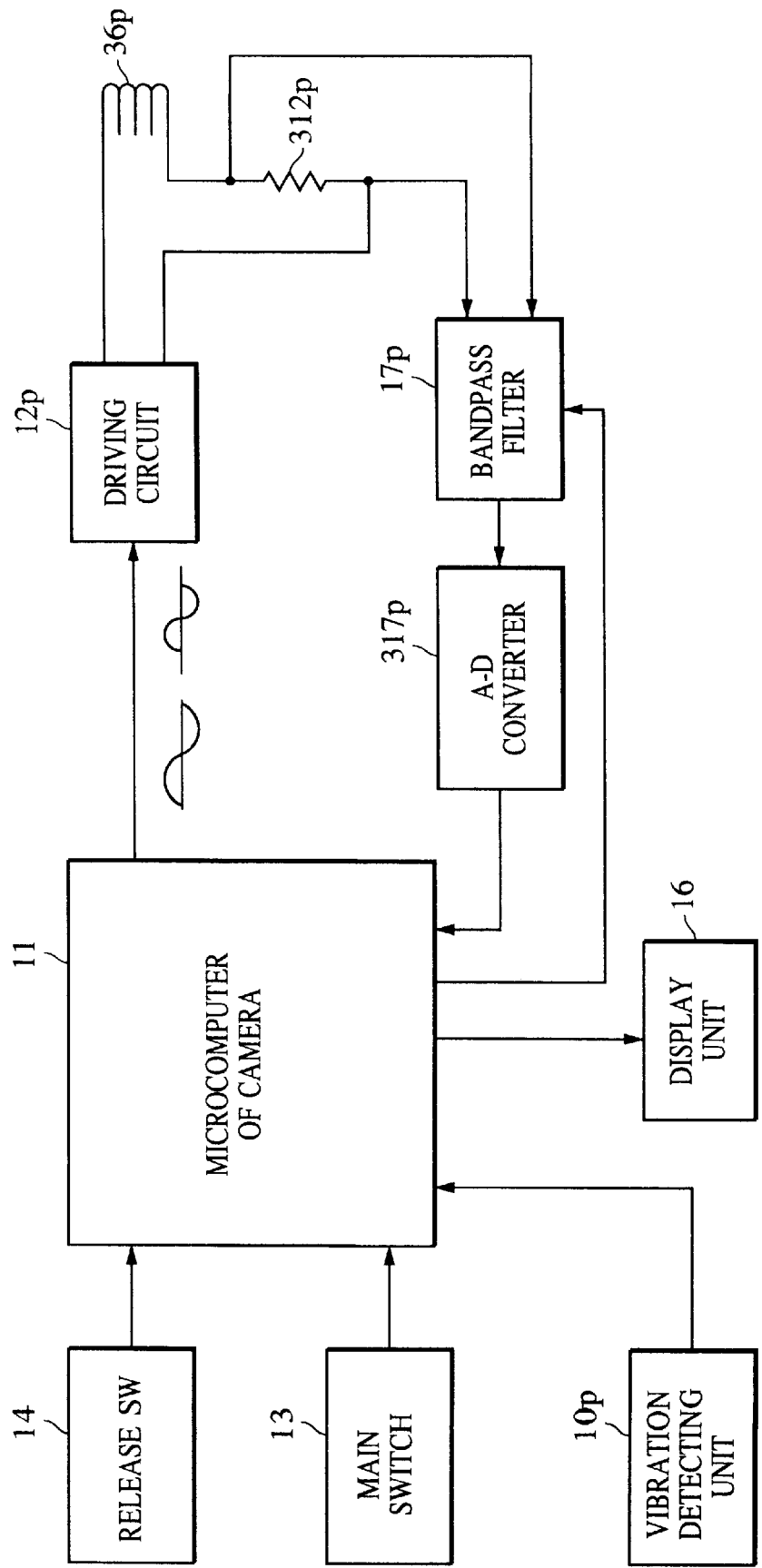
FIG. 11 is a block diagram showing a configuration of a portion related to the error determination of a compact camera according to a fourth embodiment of the present invention.

FIG. 11 is a block diagram showing a configuration of a circuit related to error determination in a compact camera according to the fourth embodiment of the present invention. The same symbols as those in FIG. 8 are assigned to the same portions, and descriptions thereof will be omitted.

The circuit configuration shown in FIG. 11 differs from that shown in FIG. 8 in that the pass band of a bandpass filter 17p can be changed by an instruction sent from a microcomputer 11 of the camera and a signal from which noise is removed by the bandpass filter 17p is input to the microcomputer 11 through an A-D converter 317p.

Before shake compensation, the microcomputer 11 sends an instruction to apply a voltage to a coil 36p at a frequency $f_1$ (for example, 5 Hz) lower than the natural frequency $f_0$ (for example, 50 Hz), and at the same time, sets the filter characteristics of the bandpass filter 17p so as to pass $f_1$. Then, the peak voltage $Vpf_1$ across a resistor is received. Next, the microcomputer 11 applies a voltage having the same magnitude to the coil 36p at the natural frequency $f_0$, sets the filter characteristics of the bandpass filter 17p so as to pass $f_0$ only at the same time, and receives the peak voltage $Vpf_0$.

The impedance of the coil becomes higher and the flowing current becomes lower in a case in which driving is performed at the natural frequency $f_0$. Therefore, the peak voltage $Vpf_1$ is larger than the peak voltage $Vpf_0$. The microcomputer 11 calculates $Vpf_1/Vpf_0$, and determines that the compensation unit operates normally when the calculated value is larger than a predetermined value (for example, $Vpf_1/Vpf_0 \geq 2$).

Figure 12:
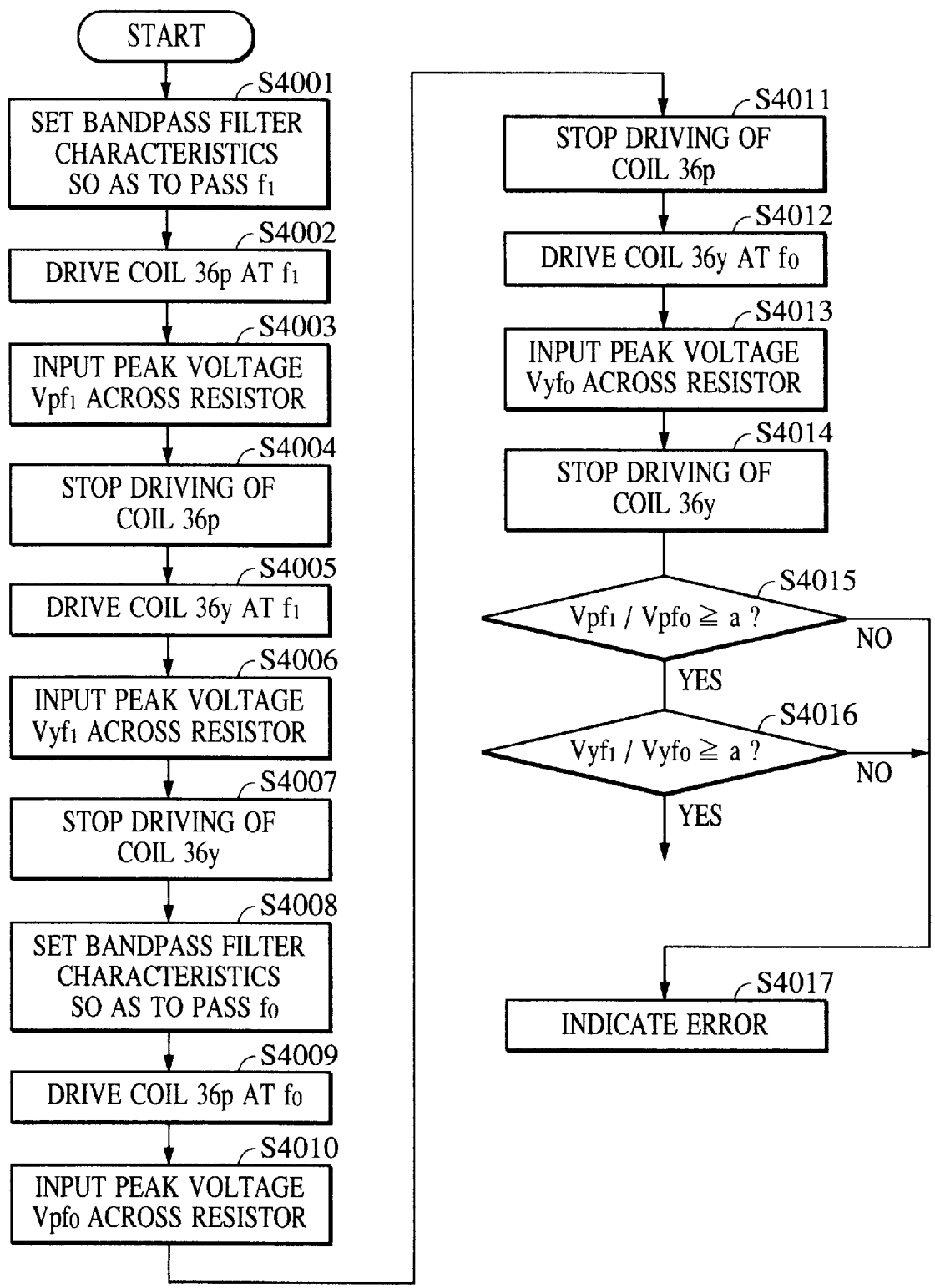
FIG. 12 is a flowchart showing operations of a portion related to the error determination of a compensation means in the compact camera according to the fourth embodiment of the present invention.

FIG. 12 is a flowchart showing operations of only a portion that determines the state of the compensation unit for the microcomputer 11 of the camera according to the fourth embodiment of the present invention. Descriptions will be made below by referring to FIG. 12.

When a main switch 13 of the camera is turned on, the microcomputer 11 starts the operations shown in FIG. 12. In a step S4001, the microcomputer 11 sets the pass frequency of the bandpass filter 17p to $f_1$ (for example, 5 Hz). In the next step S4002, the microcomputer 11 applies a voltage having the frequency $f_1$ to the coil 36p to drive the compensation means. The impedance of the coil 36p is $R_1$ at $f_1$ in FIG. 9A, and the corresponding current flows into the coil 36p at the frequency $f_1$.

In the next step S4003, noise is removed by the bandpass filter 17p from the voltage generated across a resistor 312p at the frequency $f_1$, and a peak voltage $Vpf_1$ obtained through an A-D converter 317p is stored. In the next step S4004, applying the voltage to the coil 36p is stopped. In the subsequent steps S4005 to S4007, the same operations as those in the steps S4002 to S4004 are applied to a coil 36y and a peak voltage $Vyf_1$ is stored.

In the next step S4008, the pass frequency of the bandpass filter 17p is set to $f_0$ (for example, 50 Hz). In the subsequent steps S4009 to S4014, the same operations as those in the steps S4002 to S4007 are performed at the frequency $f_0$, and peak voltages $Vpf_0$ and $Vyf_0$ obtained for the coils 36p and 36y are stored.

Driving is performed at the frequency $f_1$ first, and then at the frequency $f_0$. This is because vibration remains after driving at $f_0$ due to resonance and driving at $f_1$ cannot be performed immediately after that.

When the compensation means operates normally, the impedances of the coils 36p and 36y are $R_0$ shown in FIG. 9A. Since $R_0 > R_1$, the currents flowing across the coils when a voltage having the frequency $f_0$ is applied to the coils 36p and 36y are smaller than those obtained when a voltage having the frequency $f_1$ is applied. Therefore, the peak voltages across the resistors 312p and 312y have the relationships of $Vpf_0 < Vpf_1$ and $Vyf_0 < Vyf_1$.

In the next step S4015, the ratio of the peak voltages $Vpf_1/Vpf_0$ is obtained. When the value is smaller than a constant value (for example, 2), it is determined that the compensation means is erroneous and the procedure proceeds to a step S4017. A display unit 16 is driven to notify the condition to the user.

When the ratio of the peak voltages $Vpf_1$ and $Vpf_0$ is larger than the constant value, it is determined that the compensation means operates normally and the procedure proceeds to a step S4016. The ratio of the peak voltages $Vyf_1/Vyf_0$ is obtained. When the value is smaller than a constant value (for example, 2), it is determined that the compensation means is erroneous and the procedure proceeds to a step S4017. The display unit 16 is driven to notify the condition to the user. Conversely, when the ratio of the peak voltages $Vyf_1$ and $Vyf_0$ is larger than the constant value, it is determined that the compensation means operates normally also in the yaw direction, and the procedure proceeds to the usual camera sequence.

As described above, the compensation unit is driven at a plurality of frequencies (the natural frequency and a frequency lower than that) and changes in electromotive force (a change in impedance) induced in the coils are measured. Thus, highly reliable error determination is performed.

Fifth embodiment

The compensation means shown in FIG. 1 and FIG. 5 to FIG. 7 is driven in the direction specified by the arrow 310p at the support frame 32 when a voltage is applied to the coil 36p in FIG. 5. When the driving frequency is increased and falls in the vicinity of the natural frequency, however, the compensation unit is driven also in the direction specified by the arrow 310y as well as in the direction specified by the arrow 310p (namely, moves diagonally). This phenomenon is called "interference" and is not preferable in general. Since the natural frequency $f_0$ is set higher than a compensation band for shaking of hands (the natural frequency is set to 50 Hz whereas the compensation band ranges from 1 to 10 Hz), this phenomenon does not affect the precision of the shake compensation.

The support frame 32 is also driven in the direction specified by the arrow 310y. The electromotive force induced on the coil 36y has frequency characteristics shown in FIG. 13.

Figure 13:
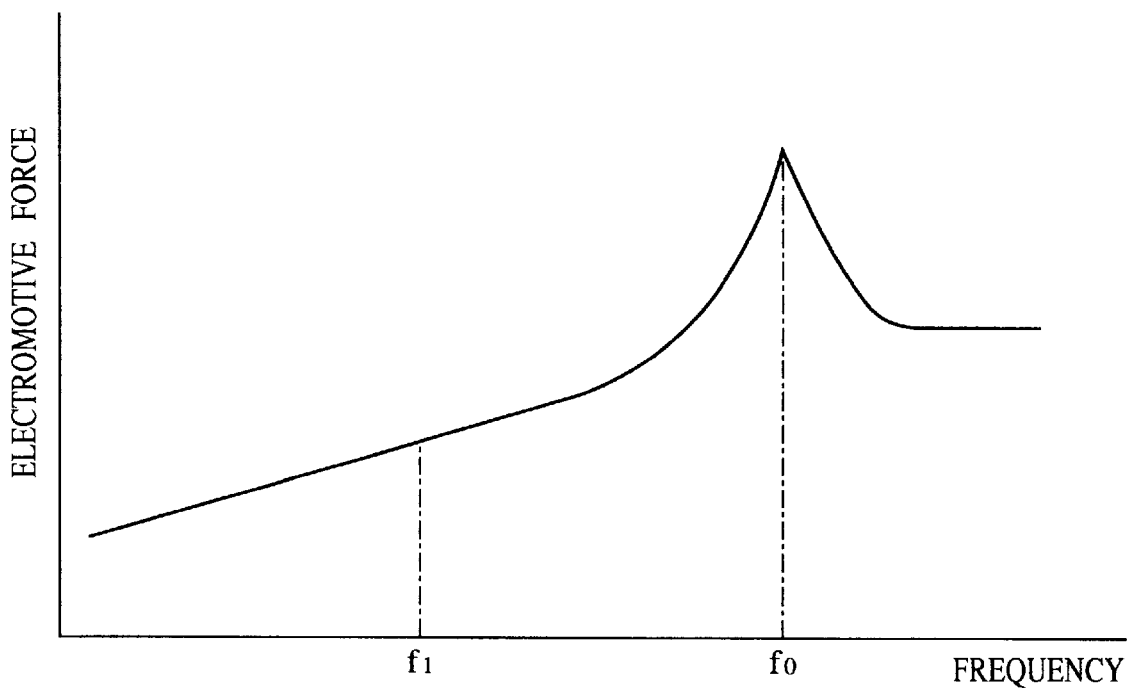
FIG. 13 is a view showing electromotive force generated in one coil by interference when the other coil is driven at different frequencies in a fifth embodiment of the present invention.

In FIG. 13, since the interference becomes large, the electromotive force has a peak at the natural frequency $f_0$. The electromotive force of the coil 36y is small at frequencies (for example, at f1) lower than the natural frequency since the interference is small. This electromotive force is not generated if the coil 36p is broken or if the compensation unit is broken, since the compensation unit cannot be driven. Even when the compensation unit can be driven, if the coil 36y is broken or if the permanent magnet 34y disposed opposite the coil 36y is erroneous, this electromotive force is not generated.

Attention is paid to the foregoing point in the fifth embodiment of the present invention. The electromotive force induced on the coil 36y by the interference phenomenon caused by driving of the coil 36p is measured to perform the error determination of the compensation unit.

Figure 14:
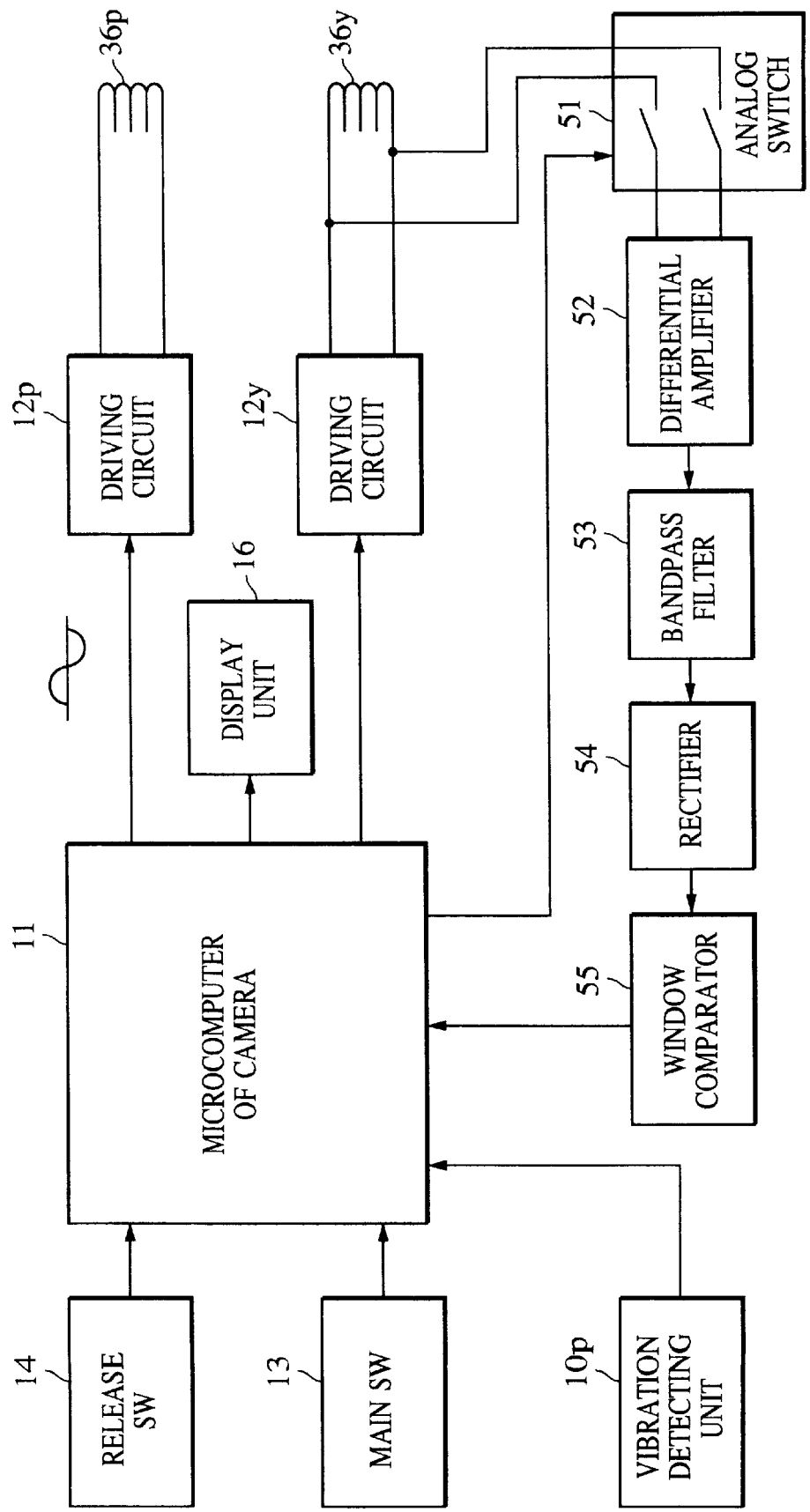
FIG. 14 is a block diagram showing a configuration of a portion related to the error determination of a compact camera according to the fifth embodiment of the present invention.

FIG. 14 is a block diagram showing a configuration of the circuit of a main section in a compact camera according to the fifth embodiment of the present invention, which implements the foregoing error determination. The same symbols as those in FIG. 8 are assigned to the same portions, and descriptions thereof will be omitted.

In FIG. 14, driving circuits 12p and 12y drive coils 36p and 36y, respectively, in shake compensation. An analog switch 51 is usually open. It is closed by an instruction sent from a microcomputer 11 of the camera while the error determination of the compensation means is being performed after a main switch 13 is turned on. A differential amplifier 52 amplifies the voltage across the coil 36y (resistor component thereof). A bandpass filter 53 (corresponding to the bandpass filter 17p shown in FIG. 8) removes noise from a signal sent from the differential amplifier 52, at frequencies other than the natural frequency.

A rectifier 54 converts the signal having the frequency $f_0$ sent from the bandpass filter 53 to a DC component by applying, for example, absolute-value processing and smoothing. This DC signal has a larger magnitude as the electromotive force across the coil 36y becomes larger.

In other words, when the compensation means operates normally, if a voltage having the frequency $f_0$ is applied to the coil 36p to drive the compensation unit, the rectifier 54 outputs a high voltage. If the compensation unit is erroneous, the rectifier 54 outputs a low voltage or no voltage.

A window comparator 55 disposed next to the rectifier 54 outputs a signal Va indicating that the compensation means is normal to the microcomputer 11 when the signal sent from the rectifier 54 is equal to or larger than a constant value.

In FIG. 14, it may be configured such that the signal of the differential amplifier 52 is analog-digital converted and input to the microcomputer 11 and the subsequent processing is performed in the microcomputer 11.

Figure 15:
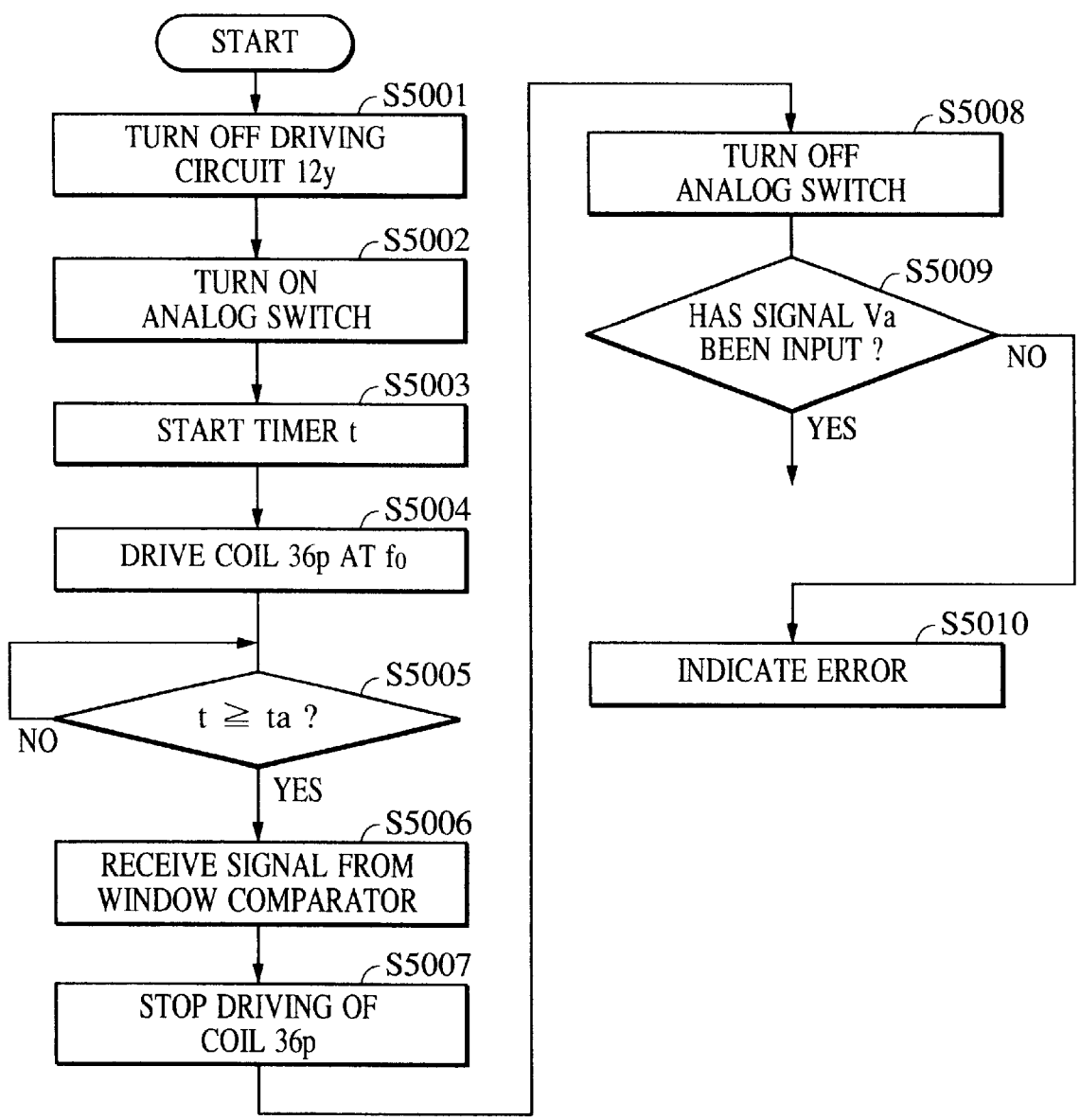
FIG. 15 is a flowchart showing operations of a portion related to the error determination of a compensation means in the compact camera according to the fifth embodiment of the present invention.

FIG. 15 is a flowchart showing operations of a portion related to error determination in the microcomputer 11 of the camera according to the fifth embodiment of the present invention.

When the main switch 13 is turned on, the microcomputer 11 starts the operations shown in FIG. 15. In a step S5001, the driving circuit 12y is turned off. In the next step S5002, the analog switch 51 is turned on to connect both ends of the coil 36y to the differential amplifier 52. In the next step S5003, a built-in timer is started. In the next step S5004, a voltage having the natural frequency $f_0$ of the compensation unit is applied to the coil 36p to drive the compensation unit.

In the next step S5005, the microcomputer waits until the timer t reaches ta (for example, 0.2 seconds). This provides waiting for the resonance of the compensation means to be stable. In the next step S5006, the microcomputer 11 receives a signal from the window comparator 55. In the next step S5007, applying the voltage to the coil 36p is stopped. In the next step S5008, the analog switch 51 is turned off.

In a step S5009, it is determined whether the signal Va is input from the window comparator 55. When the signal Va has been input, it is determined that the compensation means operates normally and the procedure proceeds to the usual camera sequence. If the signal Va is not input, it is determined that the compensation unit is erroneous and the procedure proceeds to a step S5010. A display unit 16 is driven to notify the condition to the user.

As described above, a plurality of coils are provided in order to drive the compensation means in a plurality of directions and the electromotive force induced on one coil by interference caused by driving of another coil is measured. Therefore, the error determination of the compensation means is easily performed without adding a new component.

Sixth embodiment

In the fifth embodiment, the compensation unit is driven in one direction at the natural frequency $f_0$ and interference driving generated in another direction is measured by the electromotive force of a coil. When the driving frequency is lower than the natural frequency, a slight interference driving is generated as described above. The electromotive force of the coil in the direction of interference driving is small.

In a sixth embodiment, the configuration described in the fifth embodiment is changed to that shown in the fourth embodiment. In other words, the compensation unit is driven at a frequency $f_0$ (natural frequency) and a frequency $f_1$ (lower frequency than the natural frequency) and the error determination of the compensation means is implemented by the relationship of electromotive force generated in both cases.

Figure 16:
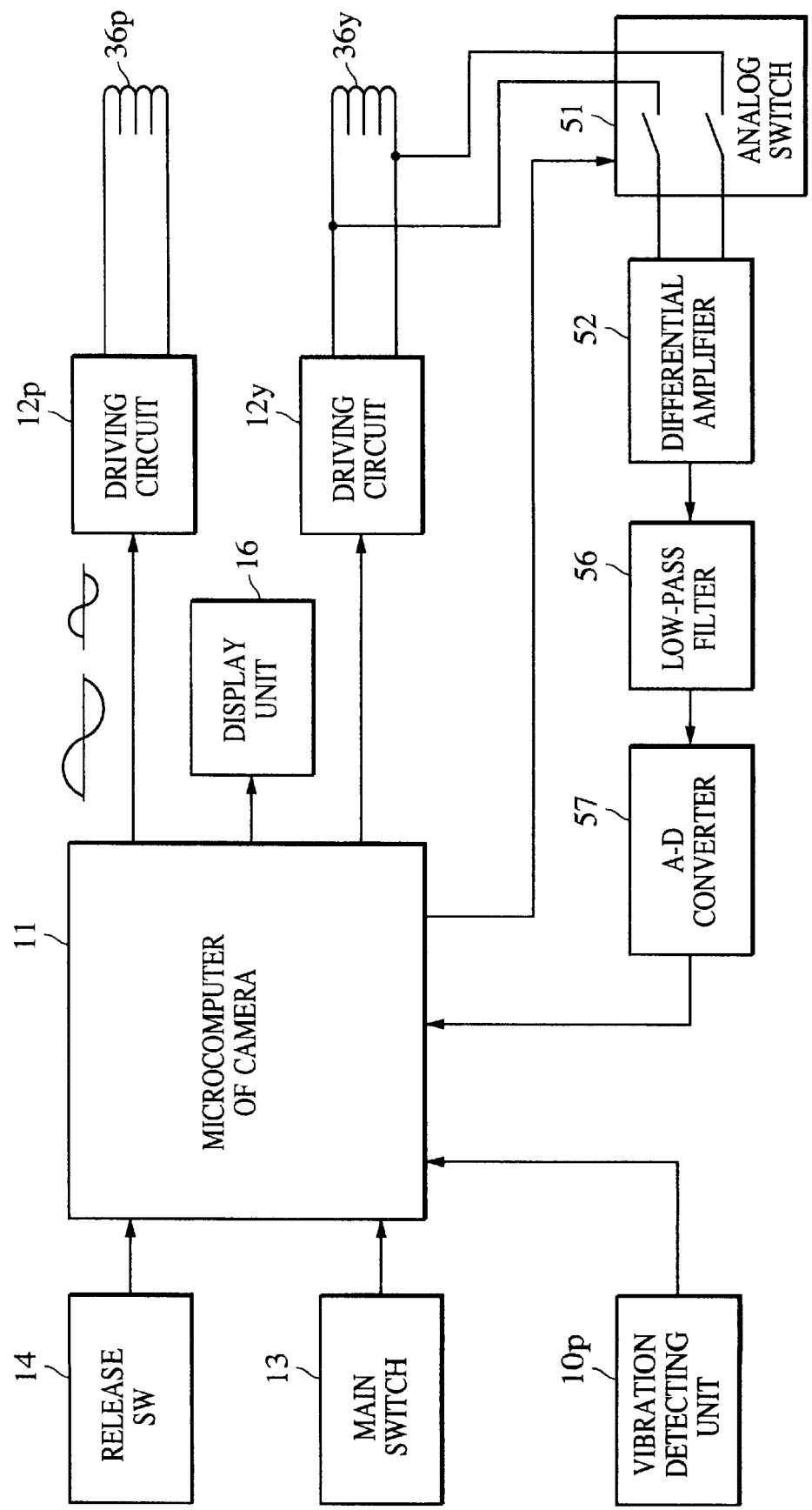
FIG. 16 is a block diagram showing a configuration of a portion related to the error determination of a compact camera according to a sixth embodiment of the present invention.

FIG. 16 is a block diagram showing a configuration of a circuit related to the error determination of compensation unit in a compact camera according to the sixth embodiment of the present invention. The same symbols as those in FIG. 14 are assigned to the same portions, and descriptions thereof will be omitted.

The circuit configuration shown in FIG. 16 differs from that shown in FIG. 14 in that the output of a differential amplifier 52 is input to a low-pass filter 56, the output of the low-pass filter 56 is analog-to-digital converted by an A-D converter 57, and the peak voltage of the output of the A-D converter 57 is obtained in a microcomputer 11.

The low-pass filter 56 is a low-pass circuit for removing signals having higher frequencies than a frequency $f_0$ and removes only noise without affecting the gains at the frequencies $f_0$ and $f_1$.

Figure 17:
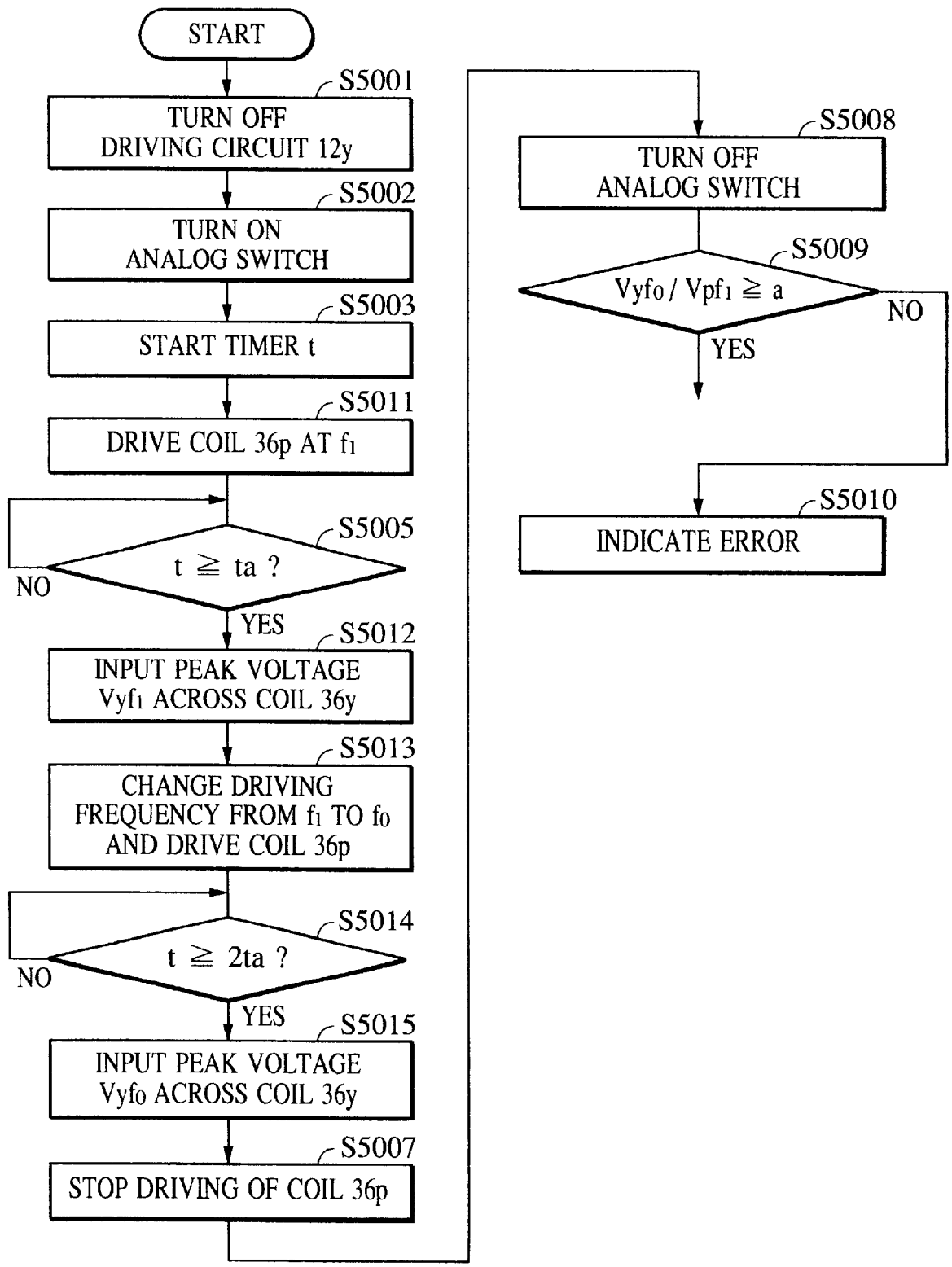
FIG. 17 is a flowchart showing operations of a portion related to the error determination of a compensation unit in the compact camera according to the sixth embodiment of the present invention.

FIG. 17 is a flowchart showing operations of a portion related to error determination in the microcomputer 11 according to the sixth embodiment of the present invention. The same step numbers as those in FIG. 15 are assigned to the same operations, and a part of descriptions thereof will be omitted.

In a step S5011, a constant voltage (for example, 0.1 V) having the frequency $f_1$ (for example, 5 Hz) is applied to a coil 36p to drive the compensation means in the 310p direction shown in FIG. 5. In the next step S5005, the microcomputer 11 waits until the driving becomes stable. Then, the procedure proceeds to a step S5012. The peak voltage $Vyf_1$ across the coil 36y is obtained from an A-D converted value sent from the A-D converter 57 and is stored.

In the next step S5013, the driving frequency of the coil 36p is changed to $f_0$ (for example, 50 Hz), and the compensation means is driven in the 310p direction at $f_0$. The same operations as in the steps S5005 and S5012 are performed in steps S5014 and S5015 to obtain the peak voltage $Vyf_0$ across the coil 36y and to store it. Then, the same operations as in the steps S5007 and S5008 of FIG. 15 are performed in steps S5007 and S5008, and the procedure proceeds to a step S5016.

In the step S5016, the ratio of the two stored peak voltages $Vyf_0/Vyf_1$ is obtained.

As described above, when the compensation means is driven in the 310p direction at the frequency $f_1$, a slight interference driving is generated in the 310y direction and the peak $Vyf_1$ of the electromotive force generated at the coil 36p is low. When the compensation means is driven in the 310p direction at the frequency $f_0$, however, a large interference driving is generated also in the 310y direction and $Vyf_0$ becomes large.

Therefore, when the value $Vyf_0/Vyf_1$ is larger than a constant value "a" (for example, 2), the compensation means operates normally. The procedure proceeds to the usual camera sequence.

If $Vyf_0/Vyf_1$ is smaller than "a," the following three cases apply.

(1) Because the coil 36p is broken (or the permanent magnet 34p is erroneous), the compensation unit cannot be driven.
(2) Because the coil 36y is broken (or the permanent magnet 34p is erroneous), electromotive force is not generated.
(3) Because any component of the compensation unit is broken, the compensation unit cannot operate correctly. Since the compensation unit has a problem in these cases, the procedure proceeds from the step S5009 to a step S5010 and a display unit 16 is driven to notify the condition to the user.

As described above, error determination is performed with the use of the relative relationship between the states of the compensation means obtained when the compensation means is driven at two driving frequencies. Thus, highly reliable error determination is implemented irrespective of imaging conditions (such as temperature, the posture of the camera, and the extending state of a body tube) in the error determination.

Correspondence between the present invention and the embodiments.

In the above embodiments, the compensation unit 68 corresponds to optical-axis shift means and a driven member of the present invention; the driving circuits 12*pa* and 12*pb*, the coils 68*pa*, 68*pb*, 68*ya*, and 68*yb*, the closed magnetic circuits 68*pc* and 68*pd*, the permanent magnets 34*p* and 34*y*, and the coils 36*p* and 36*y* correspond to driving means in the present invention; the microcomputer 11, the window comparators 15*p* and 55, the bandpass filters 17*p* and 53, the analog switch 51, and the low-pass filter 56 correspond to error-determination means of the present invention; and the resistor 312*p* corresponds to a constant resistor in the present invention.

The foregoing description shows the relationship between the elements in the embodiments and the means of the present invention. The present invention, however, is not limited to the configurations of the embodiments. It is a matter of course that any configuration can be used if the functions of the invention or the functions specified in the embodiments are implemented.

As described above, according to the embodiments of the present invention, an apparatus or camera having a vibration preventing function for accurately detecting erroneous operations of optical-axis shift means and of driving means for driving the optical-axis shift means is provided.

According to the embodiments of the present invention, an electronic unit for precisely detecting erroneous operations of a driven member and of a driving unit for driving the driven member, at low power consumption is provided.

According to the embodiments of the present invention, an electronic unit for precisely detecting erroneous operations of a driven member and of a driving unit for driving the driven member, at low power consumption without being affected by use conditions and by a difference of apparatus in which the unit to be used is provided.

According to the embodiments of the present invention, an electronic unit for accurately detecting erroneous operations of a driven member and of a driving unit for driving the driven member is provided.

Seventh embodiment

Figure 18:
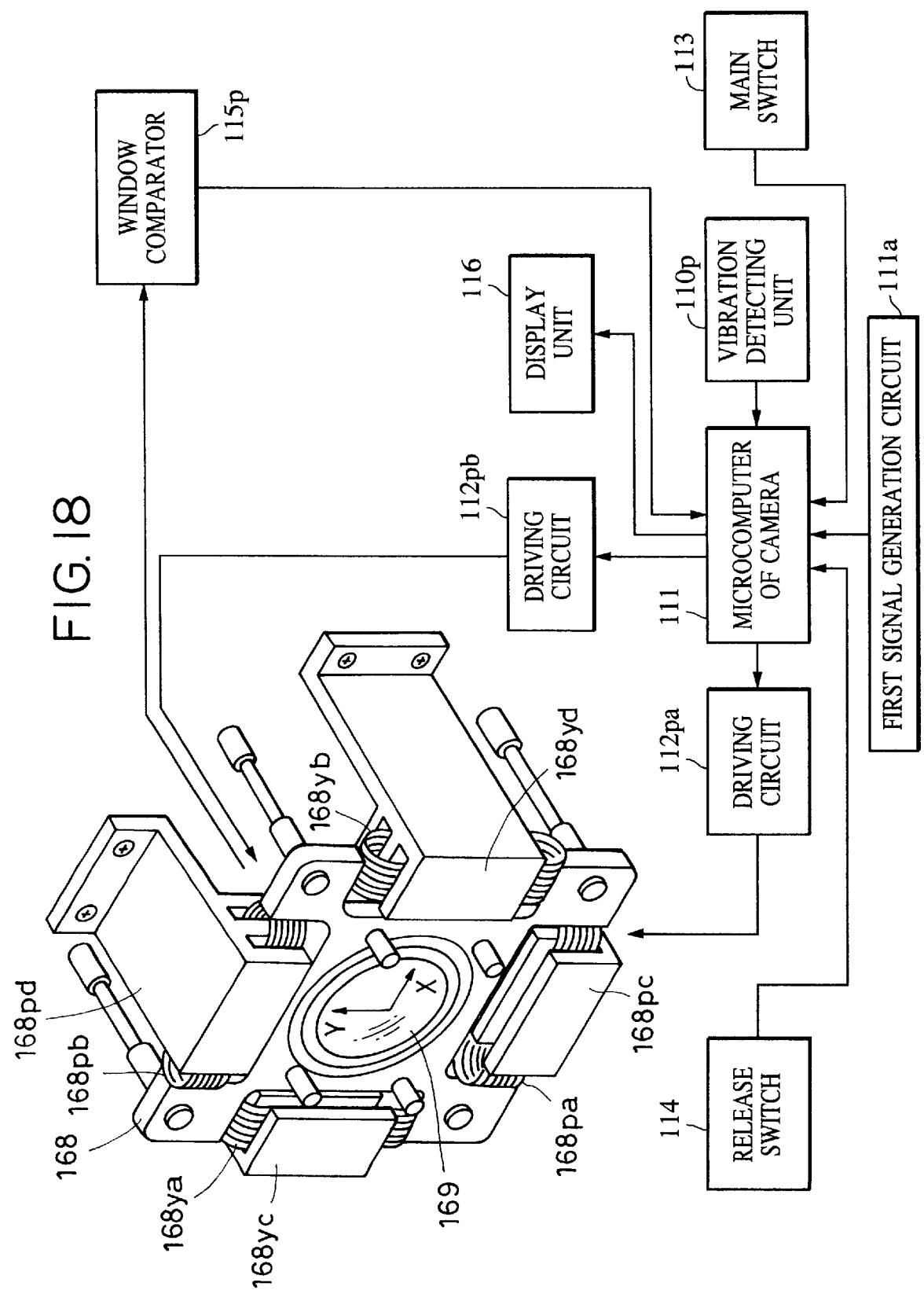
FIG. 18 is a structural view showing a main section of a compact camera according to a seventh embodiment of the present invention.

FIG. 18 is a structural view of a main section of a compact camera according to a seventh embodiment of the present invention. It is assumed that the camera includes the compensation unit shown in FIG. 35B. FIG. 18 only shows a system for vertical shaking of the camera (a shake in the Y direction shown in FIG. 35B, which is hereinafter called a shake in the pitch direction). A system for horizontal shaking of the camera (a shake in the X direction shown in FIG. 35B, which is hereinafter called a shake in the yaw direction) has the same structure.

A microcomputer 111 in the camera receives the status signals of a main switch 113 and a release switch 114 of the camera, and a shake signal of a vibration detecting unit 110*p* provided with the shake detecting sensor 71*p* shown in FIG. 35B and a calculation section for calculating the output of the sensor.

When the main switch 113 is turned on, the vibration detecting unit 110*p* starts detecting a shake. A shake signal is input to the microcomputer 111. When the release switch 114 is pressed down (actually, before then, the release switch 114 is half pressed to perform light measurement and distance measurement for an object to be taken), the microcomputer 111 causes a current to flow to coils 168*pa* and 168*pb* through driving circuits 112*pa* and 112*pb* according to the shake signal sent from the vibration detecting unit 1110*p*. Consequently, with the relation to closed magnetic circuits 168*pc* and 168*pd*, the coils 168*pa* and 168*pb* drive a compensation unit 168 (compensation optical system 169) in the Y direction to perform shake compensation.

Determination (hereinafter also called error determination) of whether the movement of the compensation unit 168 is normal or not before shake compensation will be described below.

When the main switch 113 is turned on, the microcomputer 111 superposes a first signal sent from a first signal generation circuit 111*a* onto an actual shake compensation signal and supplies a predetermined current to the coil 168*pa* through the driving circuit 112*pa*. When the current flows through the coil 168*pa*, the compensation unit 168 is normally driven in the Y direction and electromotive force is generated in the coil 168*pb* due to the relation to the closed magnetic circuit 168*pd*. If the compensation unit 168 cannot be moved due to a damage of a component caused by an external impact, or if the coil 168*pb* is broken, this electromotive force is not generated. It is a matter of course that the electromotive force is not generated if the coil 168*pa* is broken, because the compensation unit 168 is not moved.

When the microcomputer 111 supplies the current to the coil 168*pa*, it determines whether the electromotive force is generated in the coil 168*pb* by whether a signal is generated at a window comparator 115*p* for comparing the output of the coil 168*pb* with a predetermined value. If the signal is not generated (the electromotive force is not generated), in other words, if it is determined that the compensation unit 168 is not normally operated, a display unit 116 is driven to notify the condition to the user by sound or display. In FIG. 18, the first signal generation circuit 111*a* forms an independent circuit block. The microcomputer 111 may generate the first signal.

Figure 19:
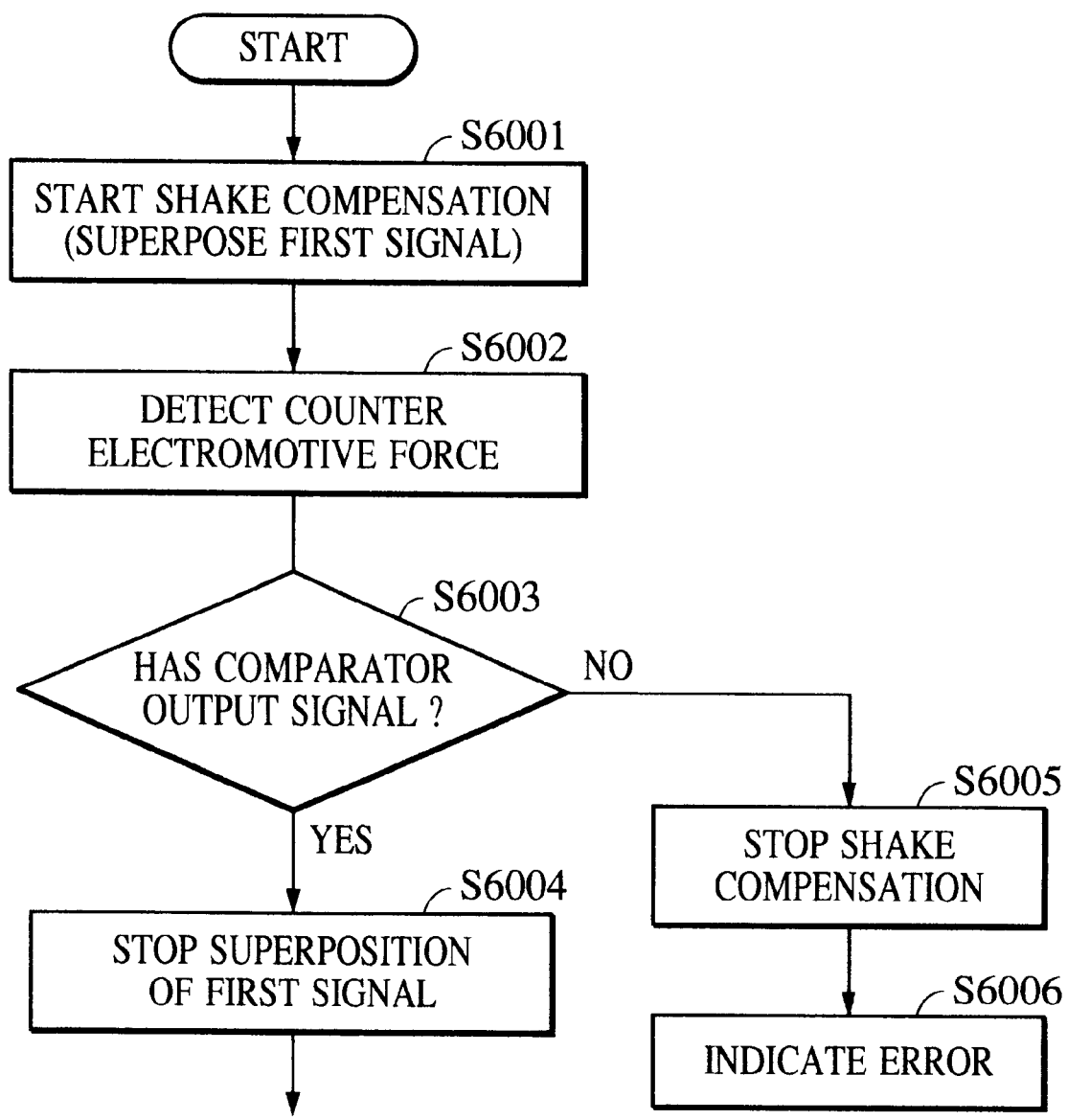
FIG. 19 is a flowchart showing operations of a portion related to the error determination of a compensation unit in the compact camera according to the seventh embodiment of the present invention.

FIG. 19 is a flowchart indicating operations of the microcomputer 111, only for determining the status of the compensation unit 168. By referring to the figure, the operations will be described below.

When the main switch 113 is turned on and a shake-compensation start instruction is issued by an operation of the release switch of the camera, the microcomputer 111 starts the operations shown in FIG. 19. In a step S6001, currents flow into the coils 168*pa* and 168*pb* to start shake compensation. The first signal and a shake-compensation target value are superposed and applied to the coil 168*pa*. In the next step S6002, electromotive force generated in the coil 168*pb* is detected. In the next step S6003, the state of the output signal of the window comparator 115*p* is determined. When the signal is input from the window comparator 115*p* to the microcomputer 111, since this means that the compensation unit 168 can operate normally, the procedure proceeds to a step S6004. Superposition of the first signal is stopped and only shake compensation is performed.

On the other hand, when a signal is not input from the window comparator 115*p*, it is determined that the compensation unit 168 cannot move normally, and the procedure proceeds to a step S6005. The currents flowing into the coils 168*pa* and 168*pb* are stopped to stop shake compensation. In the following step S6006, the display unit 116 is driven to indicate an error to notify the condition to the user.

As described above, since error determination for the compensation unit 168 is performed by applying the first signal to one coil 168*pa* and causing a current to flow into the coil 168*pa* to drive the compensation unit 168 during shake compensation and by determining whether electromotive force (counter electromotive force) induced in the other coil 168*pb* is generated, a much simpler structure is provided compared with a method in which a position detecting sensor is disposed and its movement is monitored.

To further describe details, relatively large precision units such as single-lens reflex cameras are provided with a position detecting sensor for monitoring the movement of compensation means, and error determination can be performed with the use of the position detecting sensor. Conversely, compact, inexpensive precision units such as compact cameras do not have a position detecting sensor, which increases the scale and cost of the units, and there is conventionally no method for performing error determination of compensation means in such units. With the above structure, error determination can be easily provided without increasing the scale and cost of the units. This is an enormous advantage.

The above error determination is performed with the compensation unit 168 being driven in the Y direction. The compensation unit 168 may be driven in the X direction at the same time or at another timing to perform error determination (measurement of electromotive force induced in a coil 168yb by causing a current to flow through a coil 168ya) in the direction.

The electromotive force is sent from the coil 168pb to the window comparator 115p. It may be configured such that the electromotive force itself is converted to a digital signal, the signal is sent to the microcomputer, and the microcomputer performs the determination.

Eighth embodiment

Figure 20:
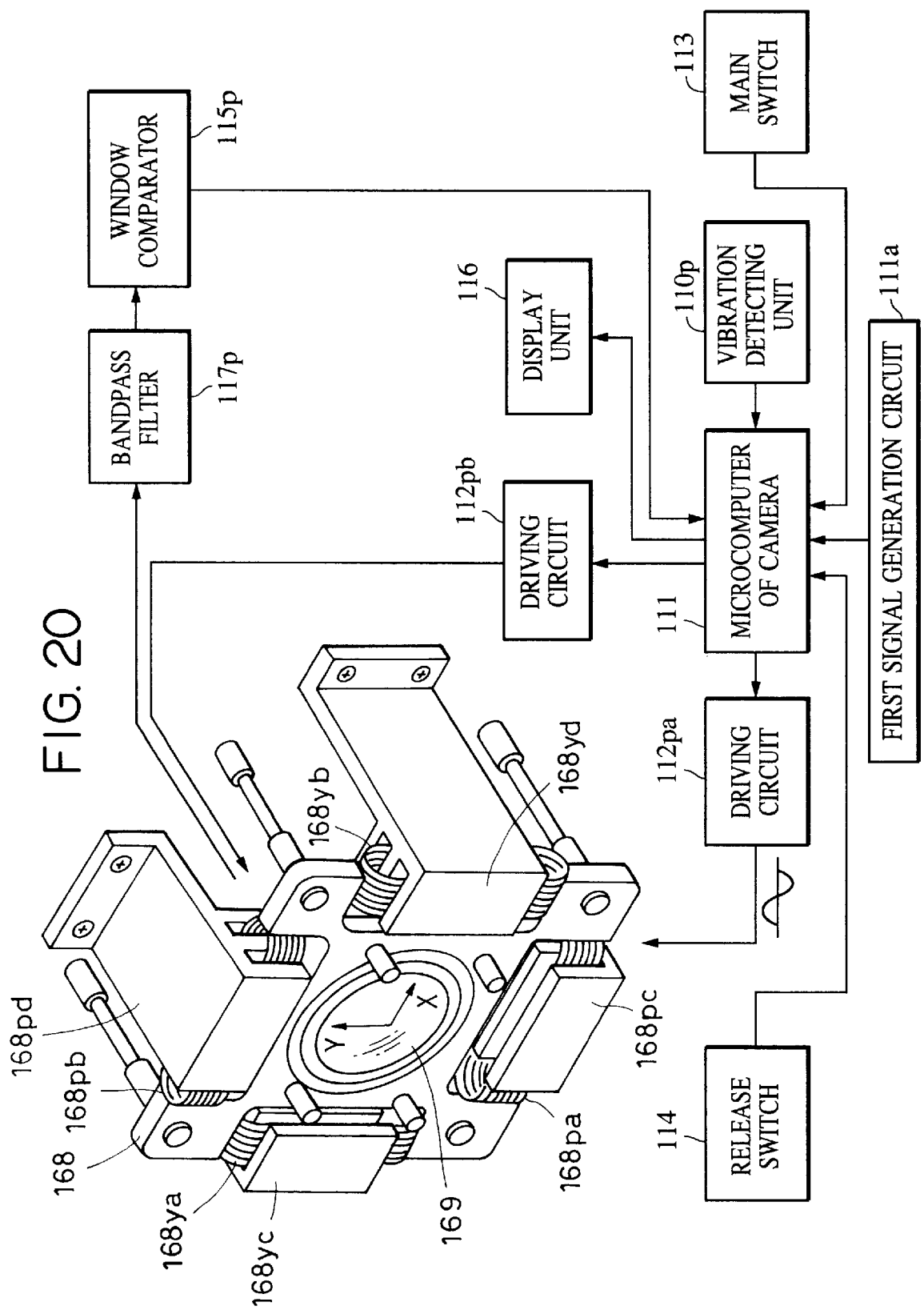
FIG. 20 is a structural view showing a main section of a compact camera according to an eighth embodiment of the present invention.

FIG. 20 is a structural view of a main section of a compact camera according to an eighth embodiment of the present invention. The same symbols as those in FIG. 18 are assigned to the same portions, and descriptions thereof will be omitted.

This embodiment differs from the seventh embodiment in that an alternating current is supplied to a coil 168pa to vibrate compensation unit 168 during shake compensation, and a band-pass filter 117p is disposed between a window comparator 115p and a coil 168pb at an electromotive-force detecting side to remove signals having frequencies other than the vibration driving frequency.

Figure 21:
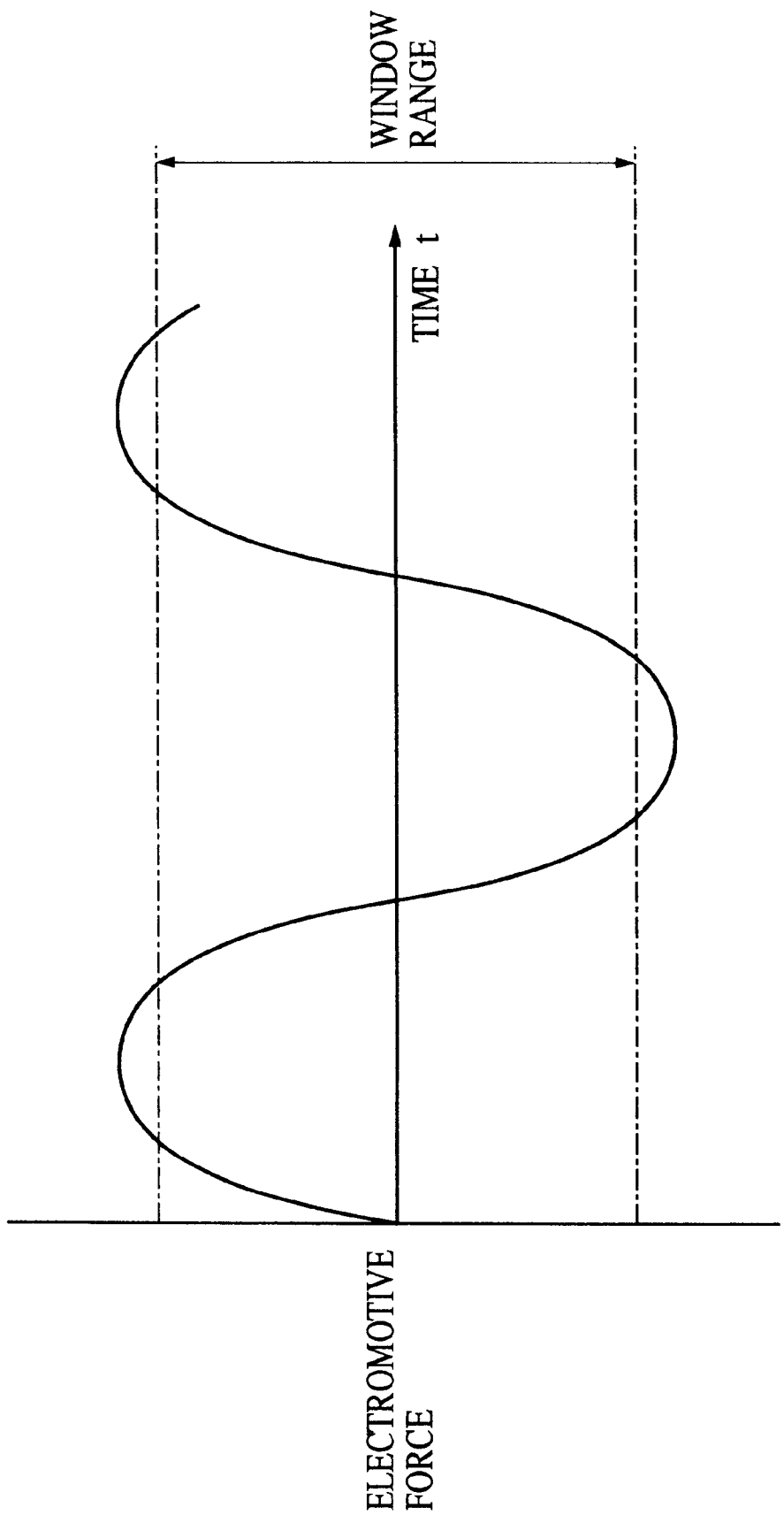
FIG. 21 is a view showing the output signal of a window comparator shown in FIG. 20.

With this configuration, noise superposed on the electromotive force induced in the coil 168pb is removed by the band-pass filter 117p. As shown in FIG. 21, the window comparator 115p outputs a signal to a microcomputer 111 of the camera to indicate that the compensation unit 168 operates normally when the input alternate signal exceeds a predetermined range.

With this configuration, noise on the coil 168pb is removed to enhance the reliability of error determination.

Ninth embodiment

Figure 22:
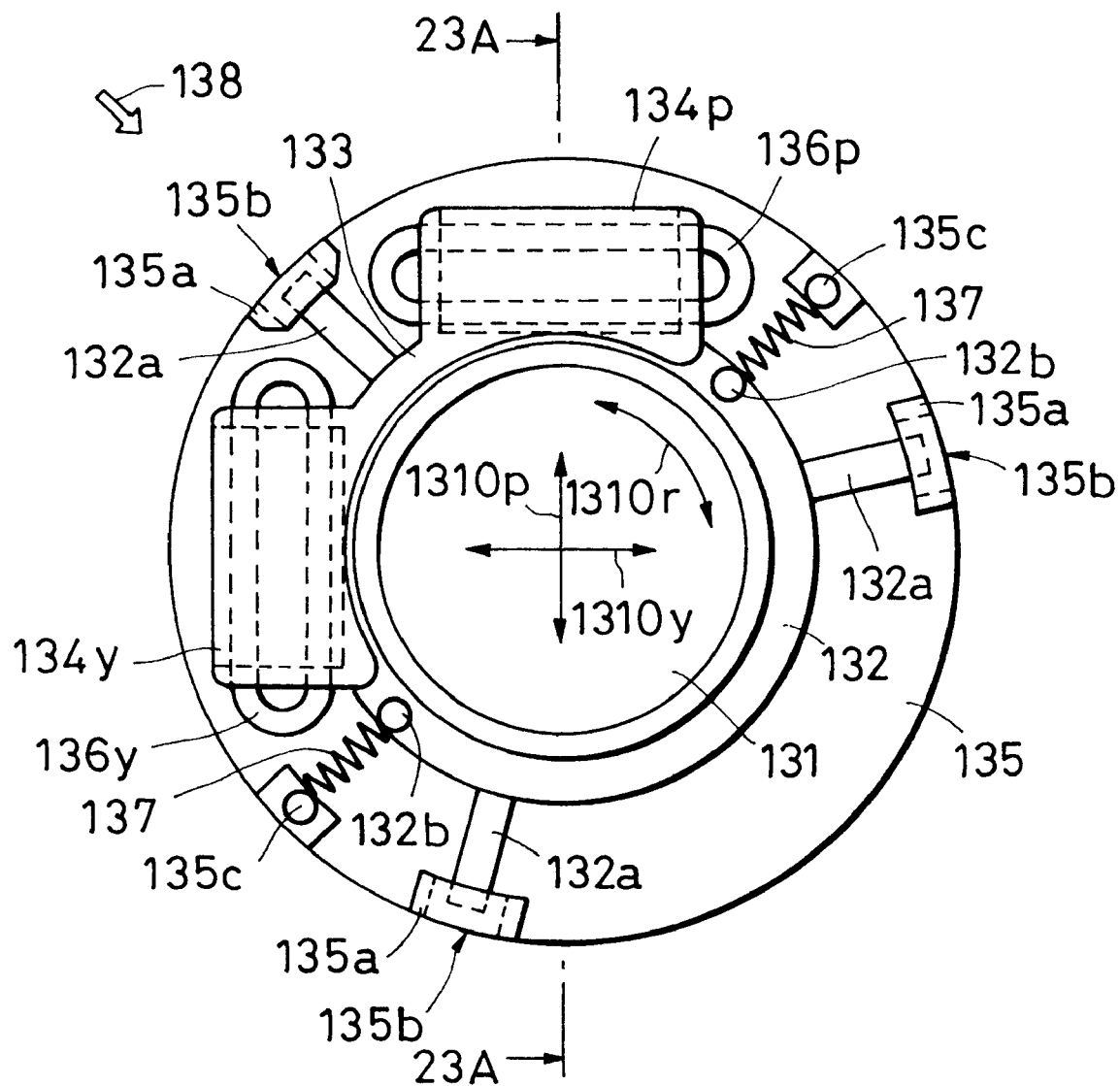
FIG. 22 is an elevation of the compensation unit in the compact camera according to the seventh embodiment of the present invention.
Figure 23A:
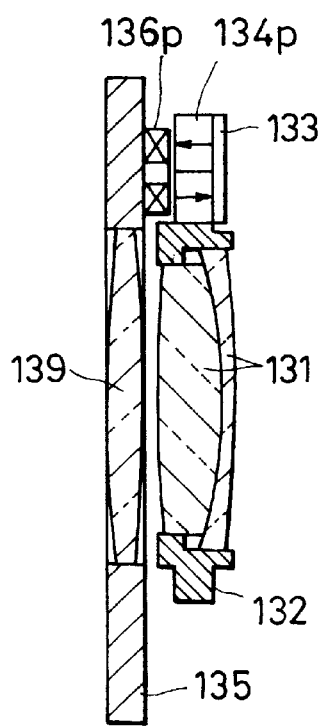
FIG. 23A is a cross section on line 23A—23A in FIG. 22.
Figure 23B:
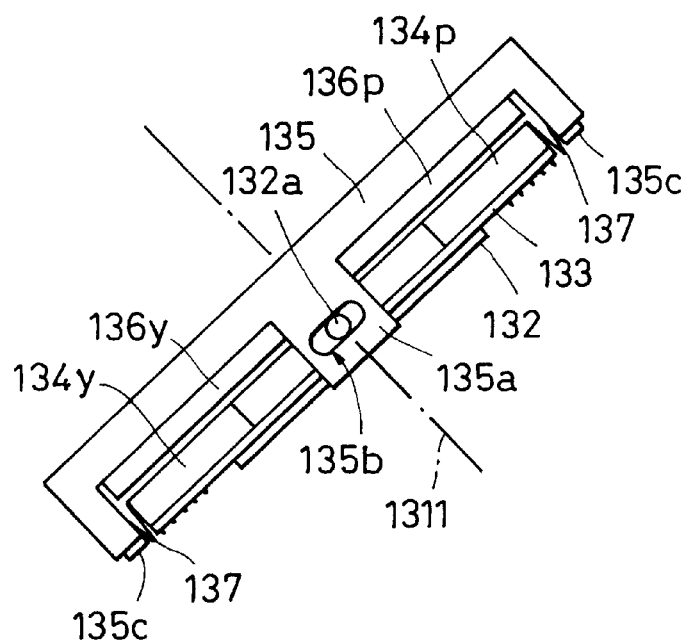
FIG. 23B is a view showing a state viewed in the direction specified by an arrow 138 in FIG. 22.
Figure 24:
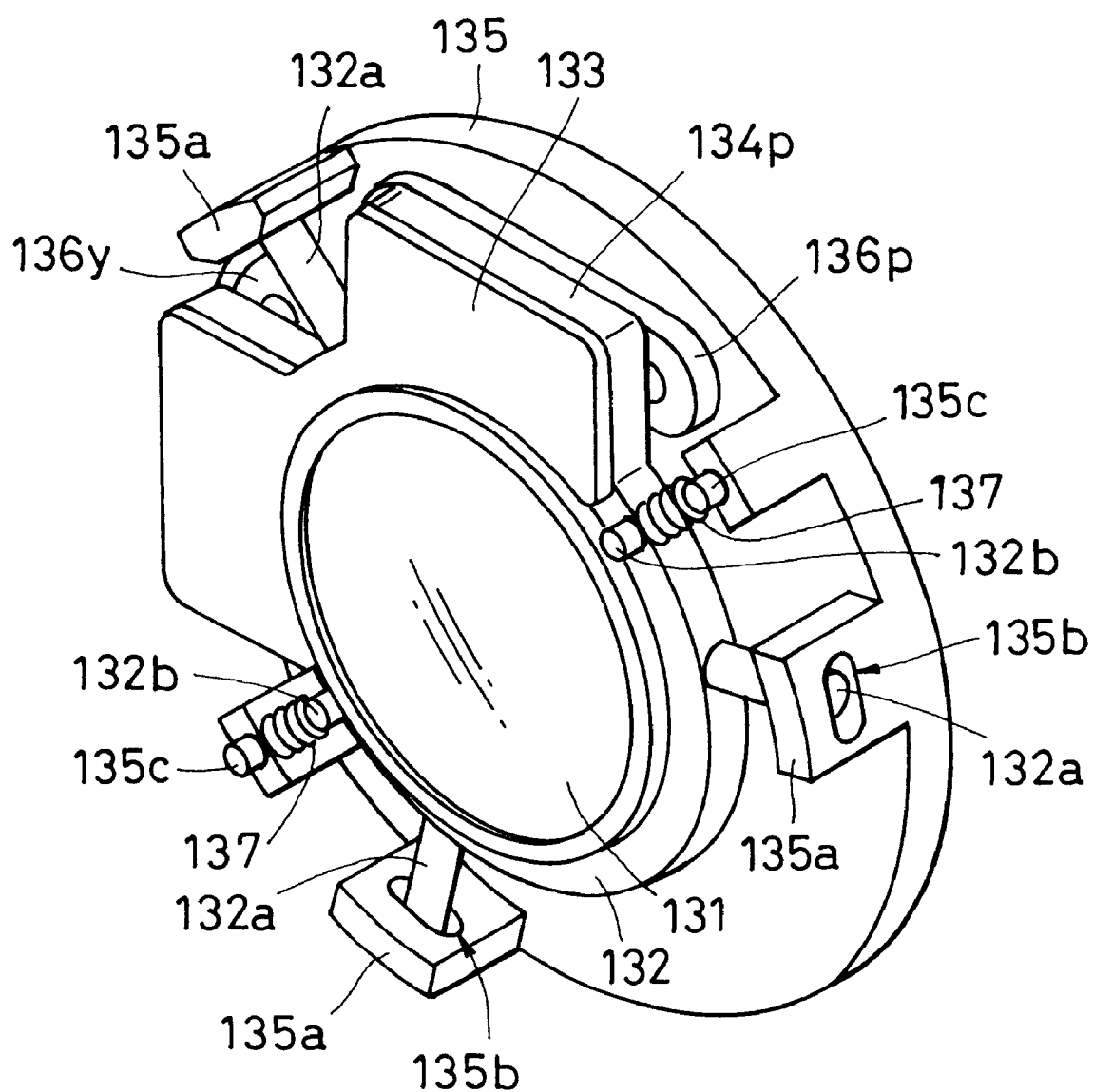
FIG. 24 is a perspective view of the compensation means shown in FIG. 22.

FIGS. 22–24 are views showing a structure of compensation means according to a ninth embodiment of the present invention. FIG. 22 is an elevation of the compensation means. FIG. 23A is a cross section on line 23A—23A in FIG. 22. FIG. 23B is a view viewed in the direction specified by an arrow 138 in FIG. 22. FIG. 24 is a perspective view of the compensation means shown in FIG. 22.

As shown in FIG. 23A, a compensation lens 131 is formed of two lenses secured to a support frame 132 and constitutes a group of an imaging optical system together with a lens 139 secured to a base plate 135. A yoke 133 made from a ferromagnetic material is mounted on the support frame 132. At the rear side of the yoke 133, permanent magnets made from neodymium are secured (shown in FIG. 22 by hidden lines). Three pins 132a extending radially from the support frame 132 are engaged in oblong holes 135b provided for side walls 135a of the base plate 135.

As shown in FIG. 23B and FIG. 24, the pins 132a and the oblong holes 135b are engaged in the optical-axis direction of the compensation lens 131 with no play. The oblong holes 135b extend in directions perpendicular to the optical axis. Therefore, the support frame 132 does not move in the optical-axis direction 1311 against the base plate 135, but can move freely in a plane (directions specified by arrows 1310p, 1310y, and 1310r in FIG. 22) perpendicular to the optical axis. Since pulling springs 137 are hooked between hooks 132b on the support frame 132 and hooks 135c on the base plate, the movement of the support frame 132 is elastically restricted in each direction (1310p, 1310y, and 1310r). Coils 136p and 136y are mounted on the base plate 135 opposite the permanent magnets 134p and 134y.

The yoke 133, the permanent magnet 134p and the coil 136p are disposed as shown in FIG. 23A (the permanent magnet 134y and the coil 136y are disposed in the same way). When a current flows into the coil 136p, the support frame 132 is driven in the direction specified by the arrow 1310p. When a current flows into the coil 136y, the support frame 132 is driven in the direction specified by the arrow 1310y. The distances of the movements are determined according to balance between the spring constants of the pulling springs 137 in the directions and the thrusts generated by the relationships between the coils 136p and 136y and the permanent magnets 134p and 134y. In other words, according to the amount of currents flowing into the coils 136p and 136y, the amounts of shifts of the compensation lens 131 can be controlled.

FIG. 25 is a block diagram showing a circuit configuration of a portion that performs error determination in a compact camera equipped with the compensation unit having the above structure. It shows only a portion that performs error determination for one axis (in the direction specified by the arrow 1310p). A portion that performs error determination for the other axis (in the direction specified by the arrow 1310y) has the same configuration.

The configuration shown in FIG. 25 differs from that shown in FIG. 20 in that a resistor 1312p (constant resistor) having a constant resistance is connected in series to a coil 136p and a voltage across the resistor 1312p is input to a bandpass filter 117p. The output of the bandpass filter 117p is synchronously detected at the frequency of a first signal sent from a first signal generation circuit 111ap, by a synchronous detector circuit 111bp, converted to a DC signal by a rectifying circuit 111cp (for example, an RMSDC converter), and input to a window comparator 115p.

Assuming that the coil 136p has a resistance of 20 $\Omega$, the resistance of the resistor 1312p is set to about 1 $\Omega$. About $\frac{1}{21}$ of the voltage applied from a driving circuit 112p to the coil 136p appears across the resistor 1312p. "About" indicates that the voltage across the resistor 1312p changes according to the frequency of the voltage applied to the coil 136p.

Figure 26A:
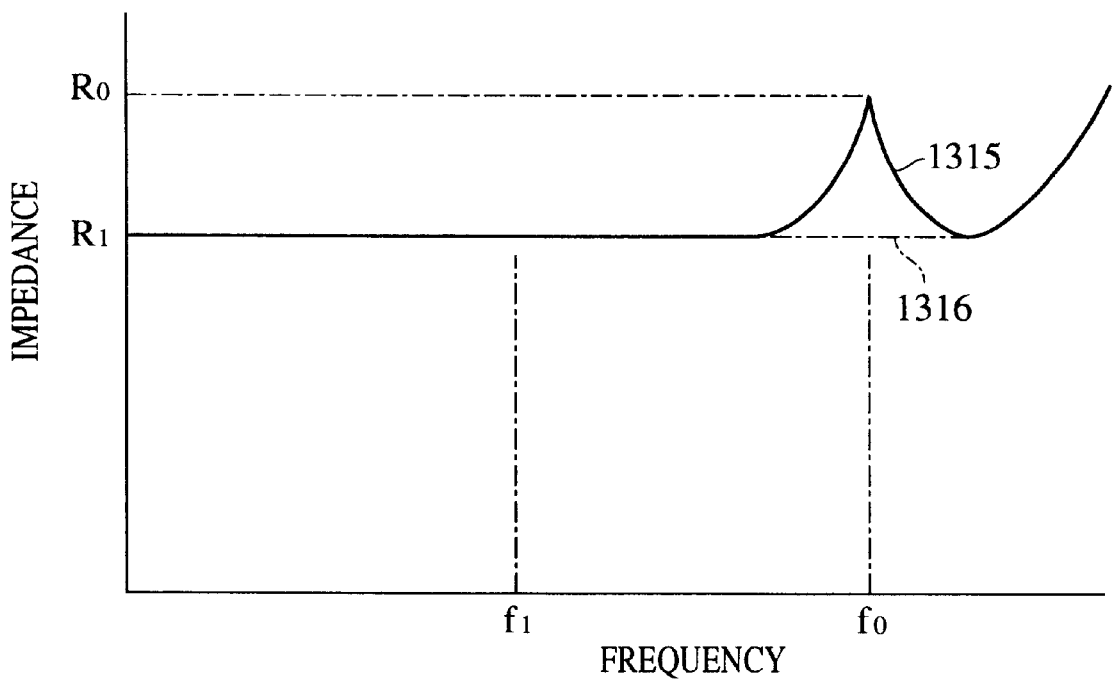
FIG. 26A is a view showing a change in impedance of a coil shown in FIG. 25 when a current flows into the coil.

FIG. 26A shows the relationship between the frequency (horizontal axis) of the voltage applied to the coil 136p and the impedance (vertical axis) of the coil 136p. The impedance becomes high at the natural frequency $f_0$ obtained by the spring constant of a pulling spring 137 and the mass of the compensation means (waveform 1315). This is because the compensation means largely vibrates at the natural frequency $f_0$ due to resonance and thereby a large counter electromotive force is generated. The impedance of the coil 136p becomes high at the higher frequency side because of the inductance of the coil 136p.

If the compensation means is broken and cannot be moved, since resonance is not generated even if the compensation unit is driven, the impedance does not become high at the natural frequency (waveform 1316).

Figure 26B:
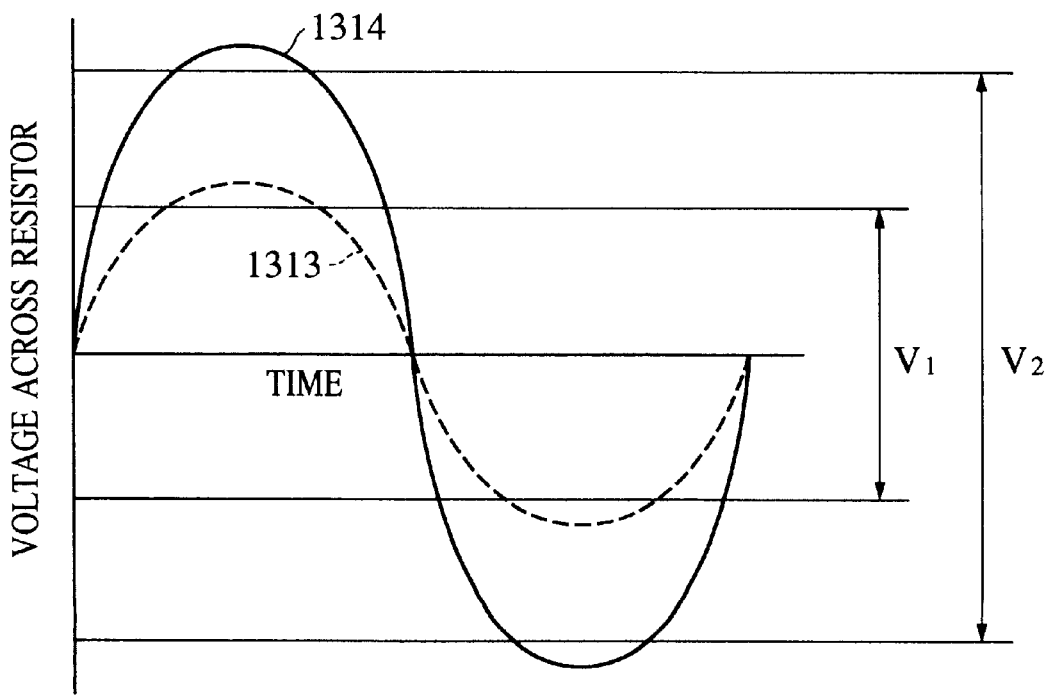
FIG. 26B is a view showing the voltage across a resistor when a current flows into the coil.

In the block diagram shown in FIG. 25, when a voltage having a natural frequency of $f_0$ and a shake signal are superposed to drive the coil 136p during shake compensation, for example, the voltage generated across the resistor 1312p has a waveform 1313 shown in FIG. 26B. If the compensation means is broken, since the impedance of the coil 136p becomes lower, the voltage comes to have a large amplitude as shown by a waveform 1314.

Noise is removed by the bandpass filter 117p, which passes only signals having frequencies in the vicinity of the natural frequency $f_0$. The voltage is demodulated at the natural frequency $f_0$ by the synchronous detector circuit 111bp and converted to a DC signal by the rectifying circuit 111cp. When the compensation unit is normal, this DC output is equal to or less than a constant value. Error determination is performed by the use of the output of the window comparator 115p.

Figure 27:
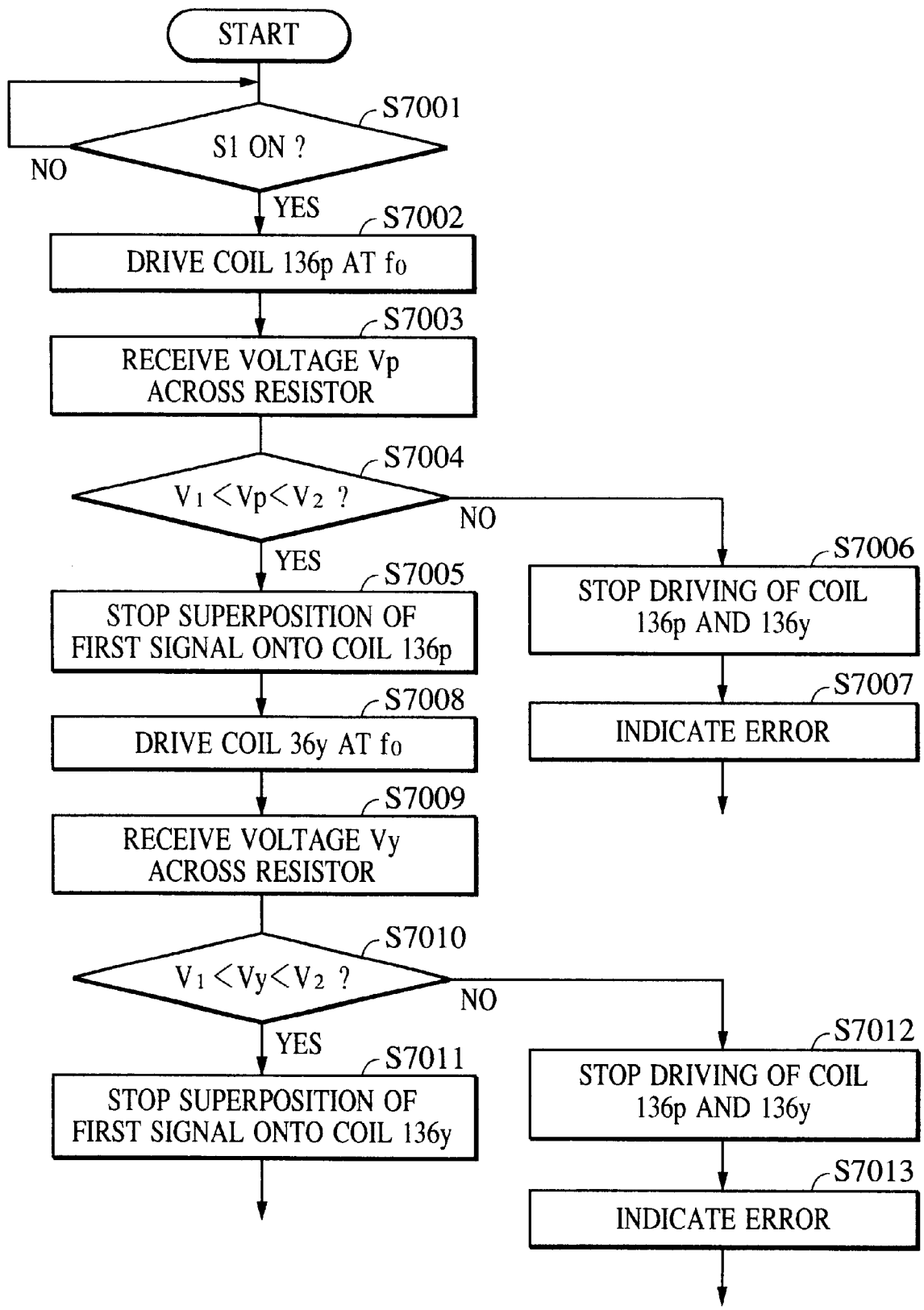
FIG. 27 is a flowchart showing operations of a portion related to the error determination of a compensation unit in the compact camera according to the ninth embodiment of the present invention.

FIG. 27 is a flowchart showing operations of a portion that determines the status of the compensation unit in the microcomputer 111 of the camera according to the ninth embodiment of the present invention.

When a main switch 113 is turned on, the microcomputer 111 starts the operations shown in FIG. 27. In a step S7001, a release button 114 is half pressed and the microcomputer 111 waits until a switch S1 is turned on. When the switch S1 is turned on, the procedure proceeds to a step S7002. Shake compensation is started, a voltage having the natural frequency $f_0$ is superposed and applied to the coil 136p, and the compensation unit is vibrated in the direction specified by the arrow 1310p in FIG. 22 while the shake compensation is being applied.

In the next step S7003, the peak voltage Vp generated across the resistor 1312p is received through the bandpass filter 117p, the synchronous detector circuit 111bp, the rectifying circuit 111cp, and the window comparator 115p. In the next step S7004, it is determined from the output of the window comparator 115p whether the peak voltage Vp across the resistor 1312p falls in a predetermined range. If the peak voltage does not fall in the range, the movement of the compensation means is erroneous. The procedure proceeds to a step S7006. Driving of the coils 136p and 136y is stopped to stop the shake compensation. In the next step S7007, the display unit 116 is driven to indicate an error to notify the condition to the user.

On the other hand, when it is determined that the peak voltage Vp across the resistor 1312p falls in the predetermined range, the procedure proceeds to a step S7005. Superposition of the first signal applied to the coil 136p is stopped. In the next step S7008, a voltage having the natural frequency $f_0$ is superposed onto the shake compensation signal of the coil 136y and the compensation unit is vibrated in the direction specified by the arrow 1310y shown in FIG. 22 during shake compensation performed by the compensation unit. In the next step S7009, the peak voltage Vy generated across a resistor 1312y not shown is received through a bandpass filter 117y not shown, the synchronous detector circuit 111bp, the rectifying circuit 111cp, and a window comparator 115y not shown.

In the next step S7010, it is determined from the output of the window comparator 115y whether the peak voltage Vy across the resistor 1312y falls in the predetermined range. If the peak voltage does not fall in the range, the movement of the compensation means is erroneous. The procedure proceeds to a step S7012. Driving of the coils 136p and 136y is stopped to stop the shake compensation. In the next step S7013, the display unit 16 is driven to indicate an error to notify the condition to the user. On the other hand, when it is determined that the peak voltage Vy across the resistor 1312y falls in the predetermined range, the procedure proceeds to a step S7011. Superposition of the first signal applied to the coil 136y is stopped and the procedure proceeds to the usual shake compensation.

In the above flow, driving of the coil 136p and that of the coil 136y are performed with a time difference, not at the same time, to avoid driving interference in two directions caused by simultaneous driving. Driving of both coils is not necessarily required. Error determination is possible only with driving of one coil.

In this flow, when the switch S1 is turned on, an error determination operation starts. Actually, light measurement and distance measurement are also performed when the switch S1 is turned on. An error determination operation may be performed prior to the light measurement and the distance measurement or after them. When vibration is not prevented, an error determination operation may be omitted.

The coils 136p and 136y are actually driven for, for example, about 0.1 seconds, and these operations do not excite an unpleasant feeling in the user.

In the ninth embodiment, attention is paid to the condition in which the impedance of the coil 136p (136y) largely changes depending on whether the compensation unit operates normally when a voltage having the natural frequency $f_0$ is applied to the coil 136p (136y). The resistor 1312p (1312y) is provided for detecting a change of the impedance, and the error determination of the compensation means is performed by measuring the voltage generated across the resistor 1312p (1312y).

Therefore, in cameras made further compact by not having two coils (for driving in the pitch and yaw directions), which are provided in the seventh and eighth embodiments, the error determination of the compensation means can be positively performed without increasing the scale and cost of the cameras.

Since the compensation means is vibrated at the natural frequency $f_0$, obtained by the spring constant of a pulling spring 137 and the mass of the compensation means, a large change in impedance can be measured by a low current flowing into the coil.

Tenth embodiment

In the ninth embodiment, the compensation means is driven at the natural frequency to measure the voltage across the resistor. In a tenth embodiment of the present invention, in addition to this voltage, the voltage across the resistor is obtained when the compensation means is driven at a frequency equal to or lower than the natural frequency, and error determination is performed with the relationship between the voltages.

The voltage generated across the resistor changes according to conditions (temperature and the posture of the camera) obtained when a picture is taken. With the use of the relative relationship between the two voltage levels, the effect of the conditions obtained when a picture is taken becomes small and highly reliable error determination is performed.

Figure 28:
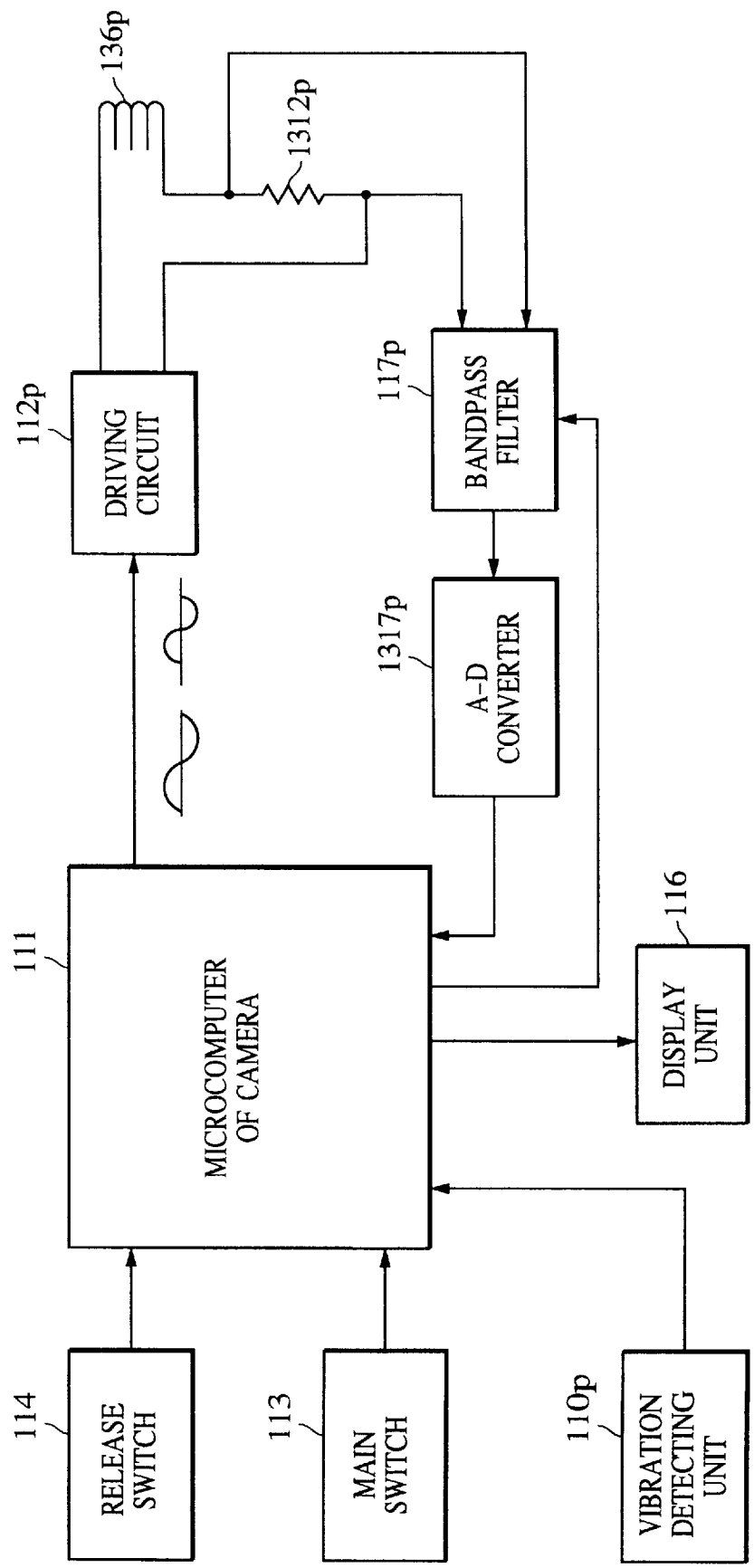
FIG. 28 is a block diagram showing a configuration of a portion related to the error determination of a compact camera according to a tenth embodiment of the present invention.

FIG. 28 is a block diagram showing a configuration of a circuit related to error determination in a compact camera according to the tenth embodiment of the present invention. The same symbols as those in FIG. 25 are assigned to the same portions, and descriptions thereof will be omitted.

The circuit configuration shown in FIG. 28 differs from that shown in FIG. 25 in that the pass band of a bandpass filter 117p can be changed by an instruction sent from a microcomputer 111 of the camera and a signal from which noise is removed by the bandpass filter 117p is input to the microcomputer 111 through an A-D converter 1317p.

During shake compensation, the microcomputer 111 sends an instruction of applying a voltage to a coil 136p at a frequency $f_1$ (for example, 5 Hz) lower than the natural frequency $f_0$ (for example, 50 Hz), and at the same time, sets the filter characteristics of the bandpass filter 117p so as to pass only $f_1$. Then, the peak voltage $Vpf_1$ across a resistor is received. Next, the microcomputer 111 applies a voltage having the same magnitude to the coil 136p at the natural frequency $f_0$, sets the filter characteristics of the bandpass filter 117p so as to pass $f_0$ only at the same time, and receives the peak voltage $Vpf_0$.

The impedance of the coil becomes higher and the flowing current becomes lower in a case in which driving is performed at the natural frequency $f_0$. Therefore, the peak voltage $Vpf_1$ is larger than the peak voltage $Vpf_0$. The microcomputer 111 calculates $Vpf_1/Vpf_0$, and determines that the compensation means operates normally when the calculated value is larger than a predetermined value (for example, $Vpf_1/Vpf_0 \geq 2$).

Figure 29:
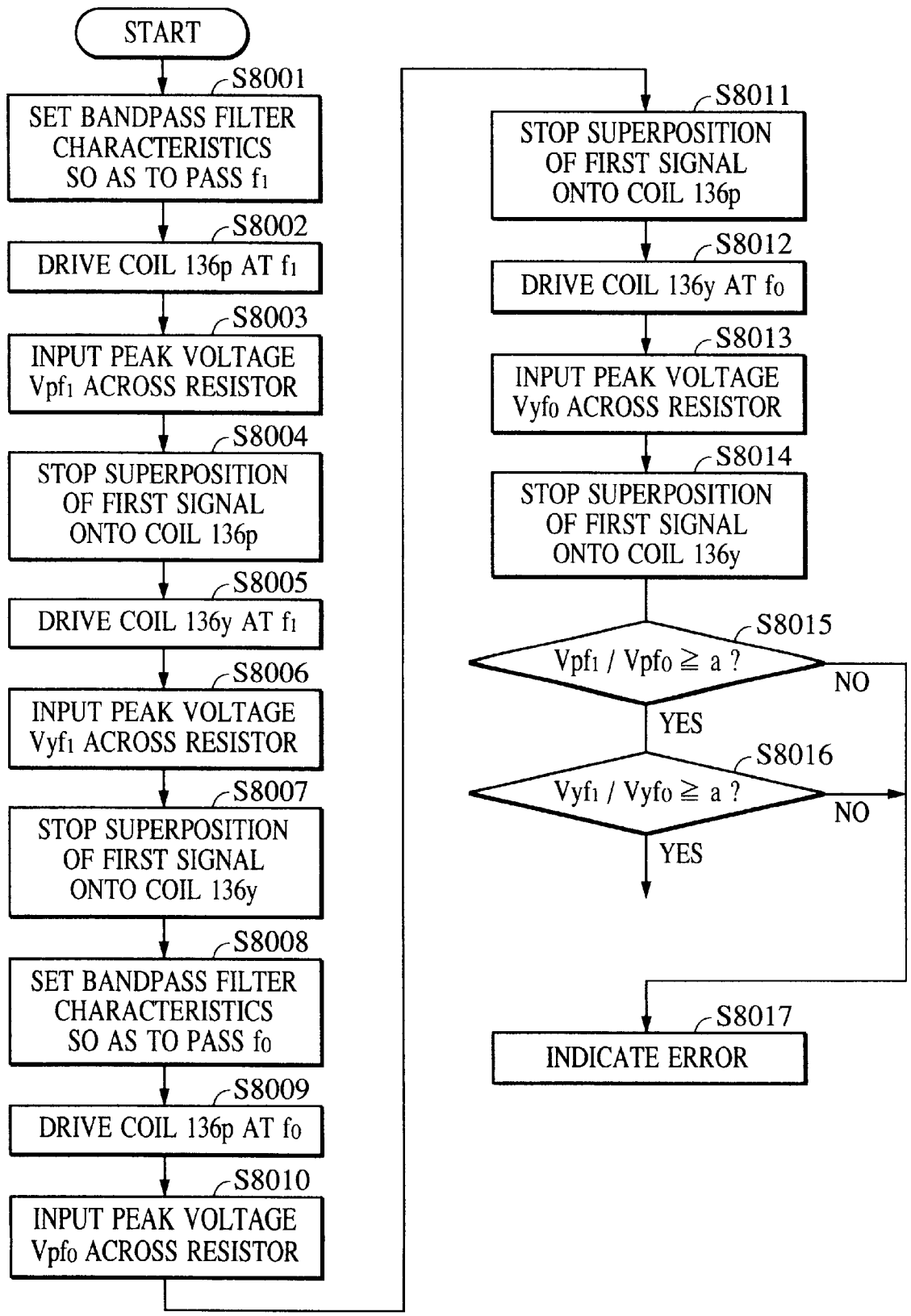
FIG. 29 is a flowchart showing operations of a portion related to the error determination of a compensation unit in the compact camera according to the tenth embodiment of the present invention.

FIG. 29 is a flowchart showing operations of only a portion that determines the state of compensation means for the microcomputer 111 of the camera according to the tenth embodiment of the present invention. Descriptions will be made below by referring to FIG. 29.

When shake compensation is started, the microcomputer 111 starts the operations shown in FIG. 29. In a step S8001, the microcomputer 111 sets the pass frequency of the bandpass filter 117p to $f_1$ (for example, 5 Hz). In the next step S8002, the microcomputer 111 superposes a voltage having the frequency $f_1$ of a first signal onto the shake compensation signal of the coil 136p to drive the compensation unit. The impedance of the coil 136p is $R_1$ at $f_1$ in FIG. 26A, and the corresponding current flows into the coil 136p at the frequency $f_1$.

In the next step S8003, noise is removed by the bandpass filter 117p from the voltage generated across a resistor 1312p at the frequency $f_1$, and a peak voltage $Vpf_1$ obtained through an A-D converter 1317p is stored. In the next step S8004, superposition of the first signal applied to the coil 136p is stopped. In the subsequent steps S8005 to S8007, the same operations as those in the steps S8002 to S8004 are applied to a coil 136y and a peak voltage $Vyf_1$ is stored.

In the next step S8008, the pass frequency of the bandpass filter 117p is set to $f_0$ (for example, 50 Hz). In the subsequent steps S8009 to S8014, the same operations as those in the steps S8002 to S8007 are performed at the frequency $f_0$, and peak voltages $Vpf_0$ and $Vyf_0$ obtained for the coils 136p and 136y are stored.

Driving is performed at the frequency $f_1$ first, and then at the frequency $f_0$. This is because, if driving at $f_0$ is performed first, vibration remains after driving at $f_0$ due to resonance and driving at $f_1$ cannot be performed immediately after that.

When the compensation unit operates normally, the impedances of the coils 136p and 136y are $R_0$ shown in FIG. 26A. Since $R_0 > R_1$, the currents flowing across the coils when a voltage having the frequency $f_0$ is applied to the coils 136p and 136y are smaller than those obtained when a voltage having the frequency $f_1$ is applied. Therefore, the peak voltages across the resistors 1312p and 1312y have the relationships of $Vpf_0 < Vpf_1$ and $Vyf_0 < Vyf_1$.

In the next step S8015, the ratio of the peak voltages $Vpf_1/Vpf_0$ is obtained. When the value is smaller than a constant value (for example, 2), it is determined that the compensation means is erroneous and the procedure proceeds to a step S8017. A display unit 116 is driven to notify the condition to the user.

When the ratio of the peak voltages $Vpf_1$ and $Vpf_0$ is larger than the constant value, it is determined that the compensation means operates normally and the procedure proceeds to a step S8016. The ratio of the peak voltages $Vyf_1/Vyf_0$ is obtained. When the value is smaller than a constant value (for example, 2), it is determined that the compensation means is erroneous and the procedure proceeds to a step S8017. The display unit 116 is driven to notify the condition to the user. Conversely, when the ratio of the peak voltages $Vyf_1$ and $Vyf_0$ is larger than the constant value, it is determined that the compensation means operates normally also in the yaw direction, and the procedure proceeds to the usual camera sequence.

As described above, the compensation means is driven at a plurality of frequencies (the natural frequency and a frequency lower than that) and changes in electromotive force (a change in impedance) induced in the coils are measured. Thus, highly reliable error determination is performed.

Eleventh embodiment

The compensation unit shown in FIG. 18 and FIG. 22 to FIG. 24 is driven in the direction specified by the arrow 1310p at the support frame 132 when a voltage is applied to the coil 136p in FIG. 22. When the driving frequency is increased and falls in the vicinity of the natural frequency, however, the compensation means is driven also in the direction specified by the arrow 1310y as well as in the direction specified by the arrow 1310p (namely, moves diagonally). This phenomenon is called "interference" and is not preferable in general. Since the natural frequency $f_0$ is set higher than a compensation band for a shake of hands (the natural frequency is set to 50 Hz whereas the compensation band ranges from 1 to 10 Hz), this phenomenon does not affect the precision of the shake compensation.

The support frame 132 is also driven in the direction specified by the arrow 1310y. The electromotive force induced on the coil 136y when the coil 136p is driven has frequency characteristics shown in FIG. 30.

Figure 30:
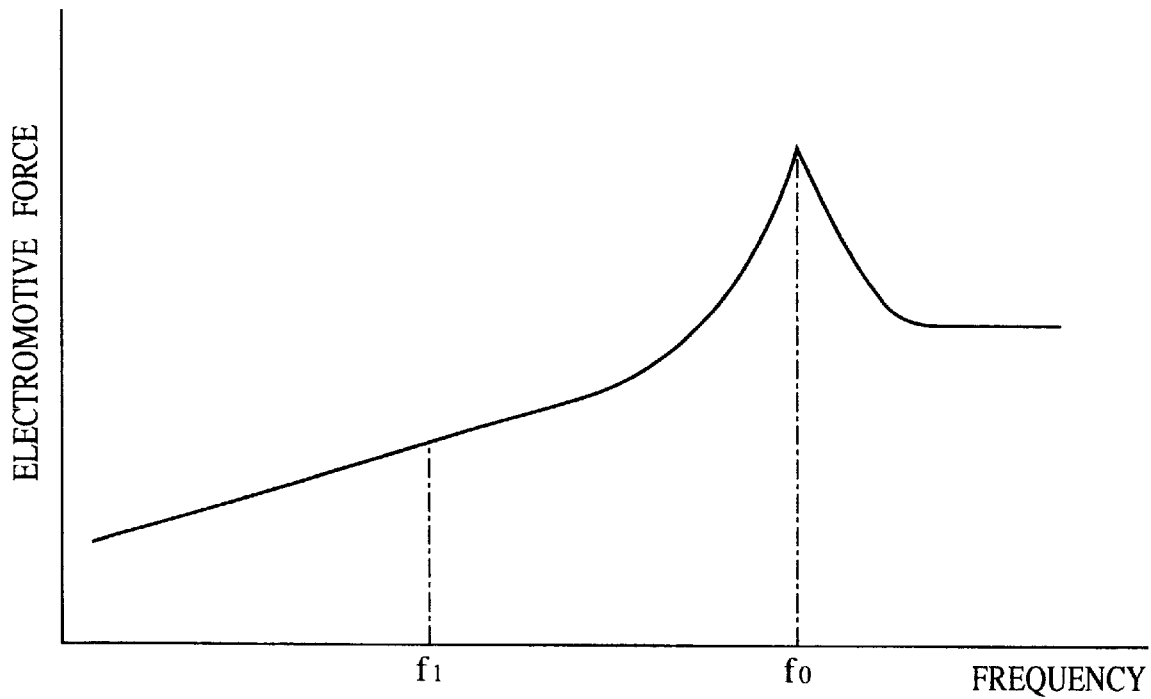
FIG. 30 is a view showing electromotive force generated in one coil by interference when the other coil is driven at different frequencies in an eleventh embodiment of the present invention.

In FIG. 30, since the interference becomes large, the electromotive force has a peak at the natural frequency $f_0$. The electromotive force of the coil 136y is small at frequencies (for example, at f1) lower than the natural frequency since the interference is small. This electromotive force is not generated if the coil 136p is broken or if the compensation unit is broken, since the compensation unit cannot be driven. Even when the compensation unit can be driven, if the coil 136y is broken or if the permanent magnet 134y disposed opposite the coil 136y is erroneous, this electromotive force is not generated.

Attention is paid to the foregoing point in the eleventh embodiment of the present invention. The electromotive force induced on the coil 136y by the interference phenomenon caused by driving of the coil 136p is measured to perform the error determination of the compensation unit.

Figure 31:
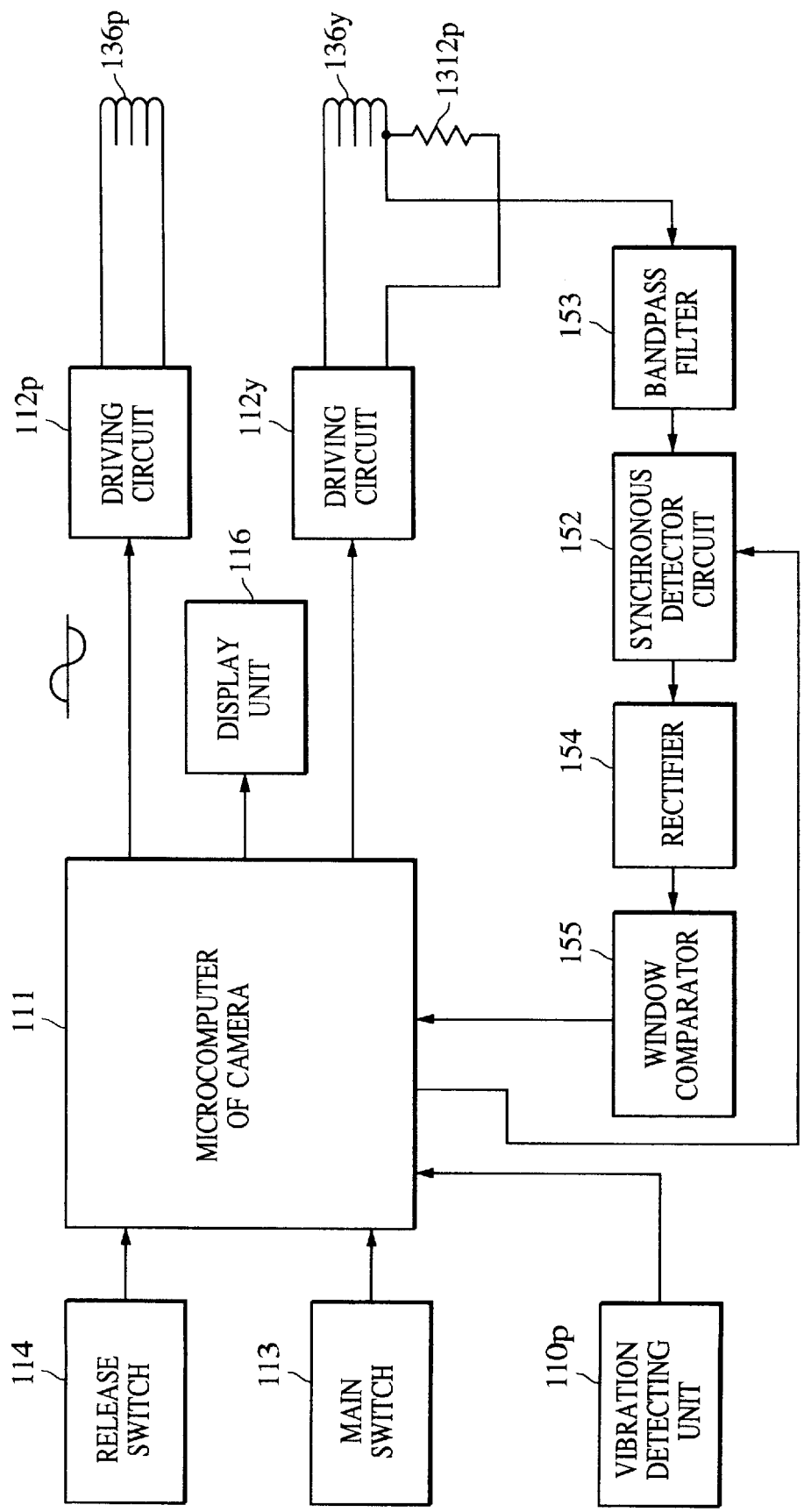
FIG. 31 is a block diagram showing a configuration of a portion related to the error determination of a compact camera according to the eleventh embodiment of the present invention.

FIG. 31 is a block diagram showing a configuration of the circuit of a main section in a compact camera according to the eleventh embodiment of the present invention, which implements the foregoing error determination. The same symbols as those in FIG. 25 are assigned to the same portions, and descriptions thereof will be omitted.

In FIG. 31, driving circuits 112p and 112y drive coils 136p and 136y, respectively, in shake compensation. A synchronous detector circuit 152 detects the signal of a bandpass filter 153 described later, in synchronization with a first signal generated by a microcomputer 111. The bandpass filter 153 (corresponding to the bandpass filter 117p shown in FIG. 25) removes noise from a signal sent from a resistor 1312p, at frequencies other than the natural frequency. A rectifier 154 converts the signal having the frequency $f_0$ sent from the synchronous detector circuit 152 to a DC component by applying, for example, absolute-value processing and smoothing. This DC signal has a larger magnitude as the electromotive force across the coil 136y becomes larger.

In other words, when the compensation unit operates normally, if a voltage having the frequency $f_0$ is applied to the coil 136p to drive the compensation unit, the rectifier 154 outputs a high voltage. If the compensation unit is erroneous, the rectifier 154 outputs a low voltage or no voltage.

A window comparator 155 disposed in the next stage outputs a signal Va indicating that the compensation unit is normal to the microcomputer 111 when the signal sent from the rectifier 154 is equal to or larger than a constant value.

In FIG. 31, it may be configured such that the signal of the synchronous detector 152 is analog-digital converted and input to the microcomputer 111 and the subsequent processing is performed in the microcomputer 111.

Figure 32:
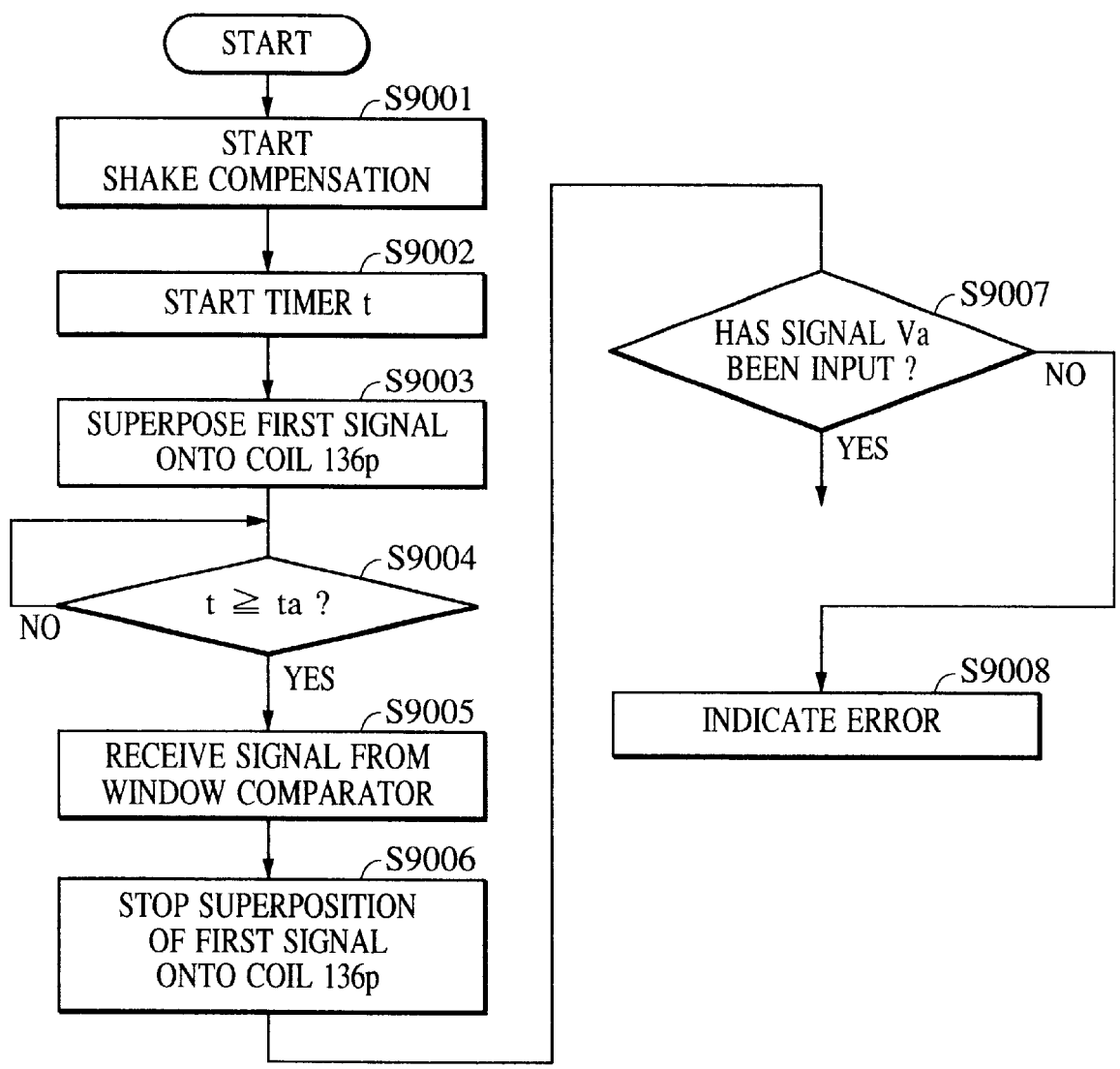
FIG. 32 is a flowchart showing operations of a portion related to the error determination of a compensation unit in the compact camera according to the eleventh embodiment of the present invention.

FIG. 32 is a flowchart showing operations of a portion related to error determination in the microcomputer 111 of the camera according to the eleventh embodiment of the present invention.

When a shake-compensation start signal is input, the microcomputer 111 starts the operations shown in FIG. 32. In a step S9001, shake compensation is started. In the next step S9002, a built-in timer is started. In the next step S9003, a first signal having the natural frequency $f_0$ of the compensation unit is superposed and applied to the coil 136p.

In the next step S9004, the microcomputer waits until the timer t reaches ta (for example, 0.2 seconds). This waiting allows the resonance of the compensation unit to be stable. In the next step S9005, the microcomputer 111 receives a signal from the window comparator 155. In the next step S9006, superposition of the first signal applied to the coil 136p is stopped.

In a step S9007, it is determined whether the signal Va is input from the window comparator 155. When the signal Va has been input, it is determined that the compensation unit operates normally and the procedure proceeds to the usual camera sequence. If the signal Va is not input, it is determined that the compensation unit is erroneous and the procedure proceeds to a step S9008. A display unit 116 is driven to notify the condition to the user.

As described above, a plurality of coils are provided in order to drive the compensation unit in a plurality of directions and the electromotive force induced on one coil by interference caused by driving of another coil is measured. Therefore, the error determination of the compensation unit is easily performed without adding a new component.

Twelfth embodiment

In the eleventh embodiment, the compensation unit is driven in one direction at the natural frequency $f_0$ and interference driving generated in another direction is measured by the electromotive force of a coil. When the driving frequency is lower than the natural frequency, a slight interference driving is generated as described above. The electromotive force of the coil in the direction of interference driving is small.

In a twelfth embodiment, the configuration described in the eleventh embodiment is changed to that shown in the tenth embodiment. In other words, compensation unit is driven at a frequency $f_0$ (natural frequency) and a frequency $f_1$ (lower frequency than the natural frequency) and the error determination of the compensation unit is implemented by the relationship of electromotive force generated in each of both cases.

Figure 33:
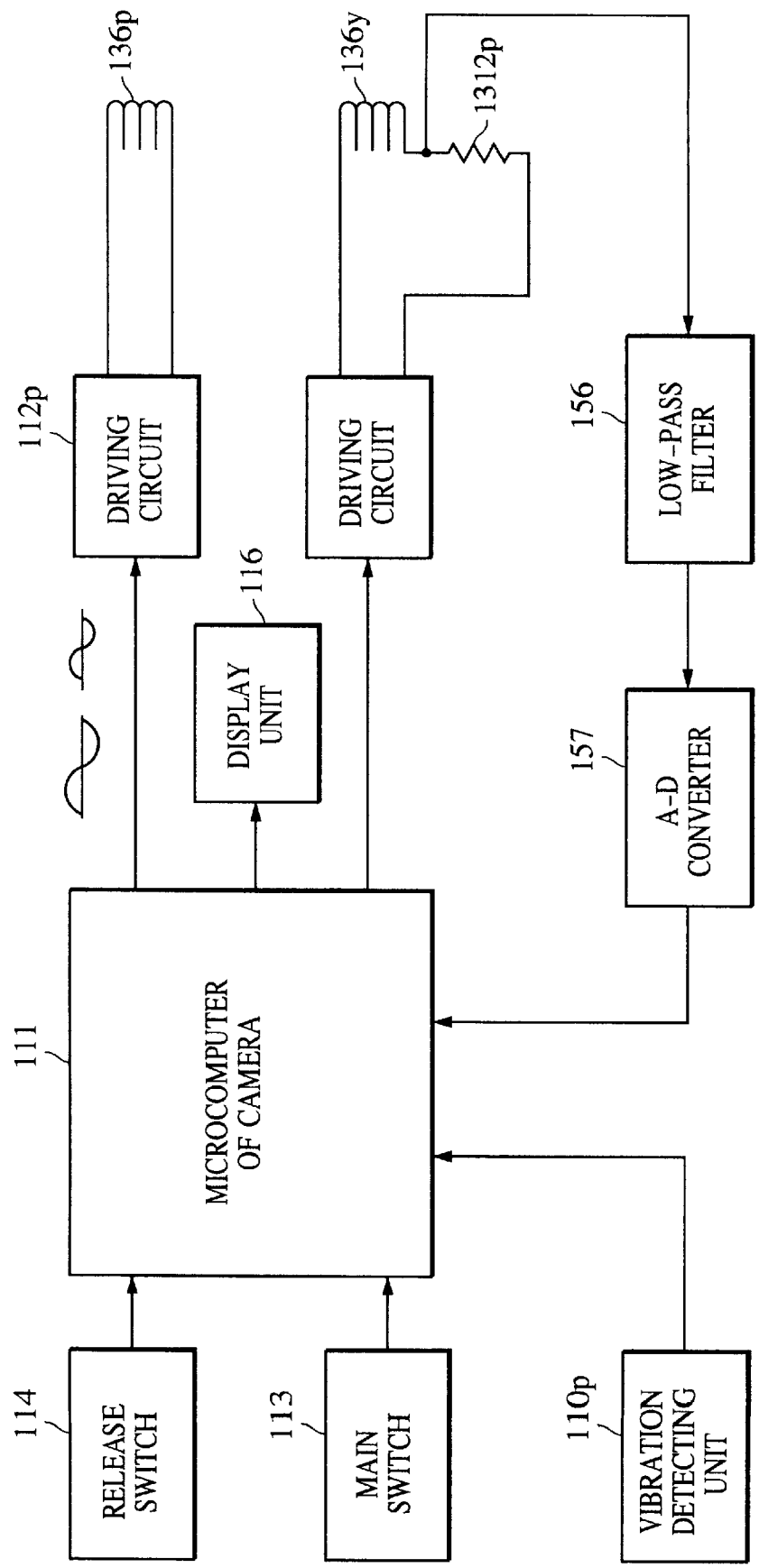
FIG. 33 is a block diagram showing a configuration of a portion related to the error determination of a compact camera according to a twelfth embodiment of the present invention.

FIG. 33 is a block diagram showing a configuration of a circuit related to the error determination of compensation unit in a compact camera according to the twelfth embodiment of the present invention. The same symbols as those in FIG. 31 are assigned to the same portions, and descriptions thereof will be omitted.

The circuit configuration shown in FIG. 33 differs from that shown in FIG. 31 only in that the bandpass filter 153 is changed to a low-pass filter 156, the output of the low-pass filter 156 is analog-to-digital converted by an A-D converter 157, and the peak voltage of the output of the A-D converter 157 is obtained in a microcomputer 111.

The low-pass filter 156 is a low-pass circuit for removing signals having higher frequencies than a frequency $f_0$ and removes only noise without affecting the gains at the frequencies $f_0$ and $f_1$.

Figure 34:
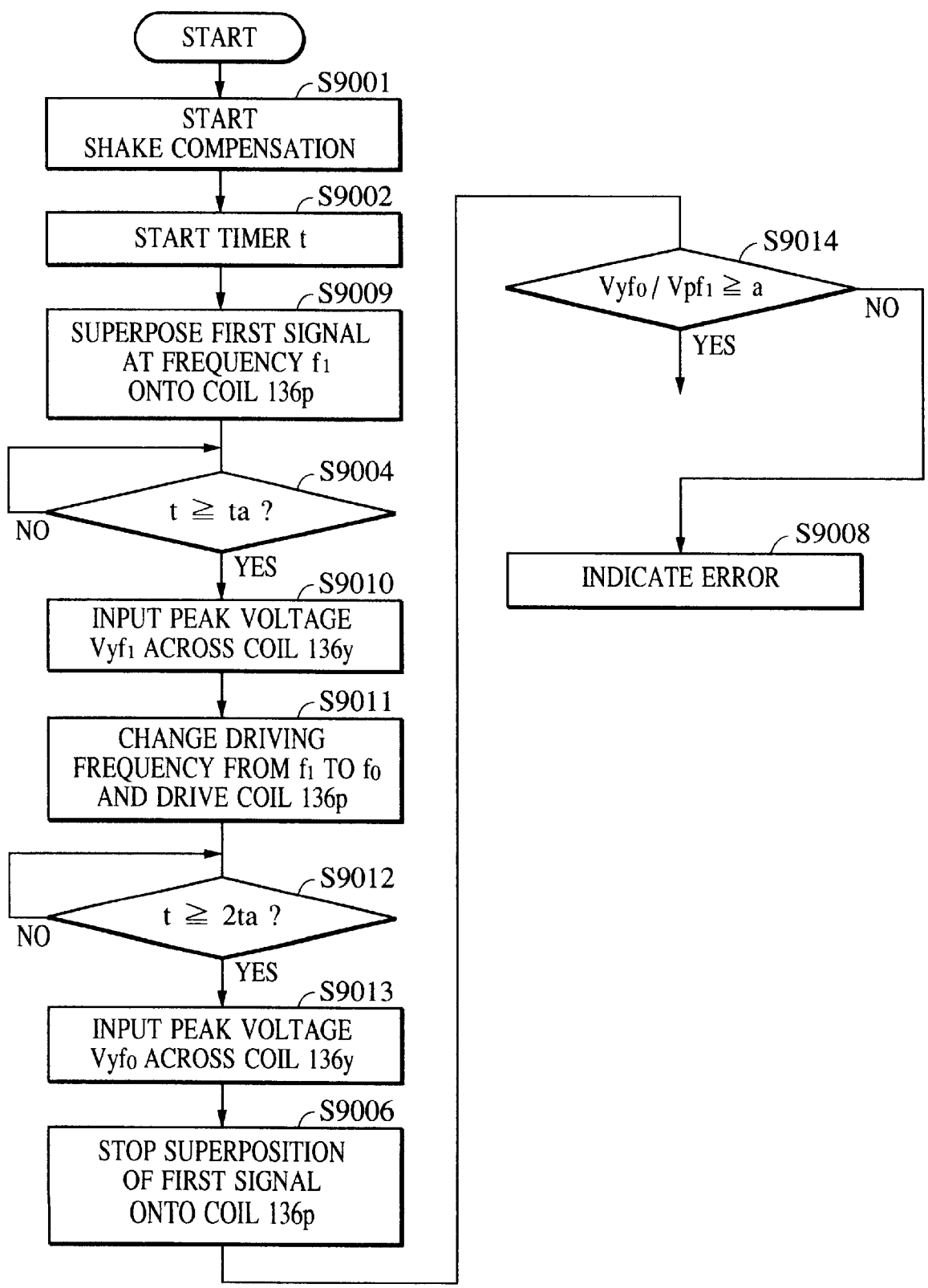
FIG. 34 is a flowchart showing operations of a portion related to the error determination of a compensation unit in the compact camera according to the twelfth embodiment of the present invention.

FIG. 34 is a flowchart showing operations of a portion related to error determination in the microcomputer 111 according to the twelfth embodiment of the present invention. The same step numbers as those in FIG. 32 are assigned to the same operations, and a part of descriptions thereof will be omitted.

In a step S9009, a constant voltage (for example, 0.1 V) having the frequency $f_1$ (for example, 5 Hz) is superposed onto a shake compensation signal and applied to a coil 136p to drive the compensation unit in the 1310p direction shown in FIG. 22. In the next step S9004, the microcomputer 111 waits until the driving becomes stable. Then, the procedure proceeds to a step S9010. The peak voltage $Vyf_1$ across the coil 136y is obtained from an A-D converted value sent from the A-D converter 157 and is stored.

In the next step S9011, the driving frequency of the coil 136p is changed to $f_0$ (for example, 50 Hz), and the compensation unit is driven in the 1310p direction at $f_0$. The same operations as in the steps S9004 and S9010 are performed in steps S9012 and S9013 to obtain the peak voltage $Vyf_0$ across the coil 136y and to store it. Then, the same operations as in the step S9006 of FIG. 32 are performed in a step S9006, and the procedure proceeds to a step S9014.

In the step S9014, the ratio of the two stored peak voltages $Vyf_0/Vyf_1$ is obtained.

As described above, when the compensation unit is driven in the 1310p direction at the frequency $f_1$, a slight interference driving is generated in the 1310y direction and the peak $Vyf_1$ of the electromotive force generated at the coil 136p is low. When the compensation unit is driven in the 1310p direction at the frequency $f_0$, however, a large interference driving is generated also in the 1310y direction and $Vyf_0$ becomes large.

Therefore, when the value $Vyf_0/Vyf_1$ is larger than a constant value "a" (for example, 2), the compensation unit operates normally. The procedure proceeds to the usual camera sequence.

If $Vyf_0/Vyf_1$ is smaller than "a," the following three cases apply.

(1) Because the coil 136p is broken (or the permanent magnet 134p is erroneous), the compensation unit cannot be driven.

(2) Because the coil 136y is broken (or the permanent magnet 134p is erroneous), electromotive force is not generated.

(3) Because any component of the compensation means is broken, the compensation unit cannot operate correctly. Since the compensation unit has a problem in these cases, the procedure proceeds from the step S9014 to a step S9008 and a display unit 116 is driven to notify the condition to the user.

As described above, error determination is performed with the use of the relative relationship between the states of the compensation unit obtained when the compensation means is driven at two driving frequencies. Thus, highly reliable error determination is implemented irrespective of imaging conditions (such as temperature, the posture of the camera, and the extending state of a body tube) in the error determination.

As described above, according to the seventh to twelfth embodiments of the present invention, an apparatus or camera having a vibration preventing function for accurately detecting erroneous operations of optical-axis shift units and of driving units for driving the optical-axis shift units is provided.

In each of the above first to twelfth embodiments, optical-axis shift unit moves the compensation optical system in a plane perpendicular to the optical axis. The present invention can also be applied to an apparatus employing an optical-flux change unit such as a variable-apical-angle prism and an apparatus in which an imaging plane is moved in a screen perpendicular to the optical axis.

In each of the above first to twelfth embodiments, a compact camera is taken as an example. The present invention can also be applied to various types of cameras such as single-lens reflex cameras, interchangeable lenses, optical units other than cameras, and other electrical units.

The present invention may have a configuration formed of an appropriate combination of the above embodiments and technologies thereof.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-shake compensation apparatus comprising:
   movable means for moving for image-shake compensation;
   driving means for driving said movable means; and
   determination means for determining whether said driving means is in condition to drive said movable means,
   wherein said determination means inputs a predetermined driving signal for operating said driving means to said driving means, and concurrently, detects a prescribed electromotive force induced on an electrically conductive section which is disposed in a magnetic flux and which generates a displacement relative to the magnetic flux due to the movement of said movable means to perform the determination.

2. An image-shake compensation apparatus according to claim 1, wherein said determination means includes means for determining that said driving means is ready to drive said movable means, according to a condition in which the prescribed electromotive force is induced on the electrically conductive section when the predetermined driving signal is input to said driving means.

3. An image-shake compensation apparatus according to claim 1, wherein said determination means includes means for determining that said driving means is not ready to drive said movable means, according to a condition in which the prescribed electromotive force is not induced on the electrically conductive section when the predetermined driving signal is input to said driving means.

4. An image-shake compensation apparatus according to claim 1, further comprising a driving section for driving said movable means, wherein the electrically conductive section is a part of said driving section.

5. An image-shake compensation apparatus according to claim 1, wherein the electrically conductive section is a part of said driving means operating according to the predetermined driving signal.

6. An image-shake compensation apparatus according to claim 5, wherein the electrically conductive section is driven according to the predetermined driving signal, and
   said determination means includes means for determining whether an electromotive force independent of that caused by the driving formed according to the predetermined driving signal is generated in the electrically conductive section.

7. An image-shake compensation apparatus according to claim 1, wherein the electrically conductive section is a part of another driving means separate from said driving means operating according to the predetermined driving signal.

8. An image-shake compensation apparatus according to claim 7, wherein said driving means operating according to the predetermined driving signal includes means for driving said movable means in a first direction, and the another driving means, which includes the electrically conductive section, includes means for driving said movable means in a second direction different from the first direction.

9. An image-shake compensation apparatus according to claim 7, wherein said driving means operating according to the predetermined driving signal includes means for driving said movable means in a first direction, and the another driving means, which includes the electrically conductive section, includes means for driving said movable means in the first direction.

10. An image-shake compensation apparatus according to claim 7, wherein said determination means includes means for determining whether the prescribed electromotive force is induced in the electrically conductive section included in the another driving means, in a condition in which driving according to the predetermined driving signal is achieved but driving according to a driving signal for driving said movable means is not achieved in the electrically conductive section included in the another driving means.

11. An image-shake compensation apparatus according to claim 1, wherein said driving means includes means for driving said movable means according to an image-shake signal corresponding to a shake of an image to compensate for the shake of the image.

12. An image-shake compensation apparatus according to claim 11, wherein said determination means includes means for performing the determination prior to the start of an image-shake compensation operation for driving said movable means according to the image-shake signal.

13. An image-shake compensation apparatus according to claim 12, wherein said determination means includes means for inputting the predetermined driving signal to said driving means to drive said movable means for the determination prior to the start of the image-shake compensation operation for driving said movable means according to the image-shake signal.

14. An image-shake compensation apparatus according to claim 11, wherein said determination means includes means for performing the determination in a condition in which the image-shake signal is input to said driving means for the image-shake compensation operation.

15. An image-shake compensation apparatus according to claim 14, wherein said determination means includes means for inputting the predetermined driving signal together with the image-shake signal to said driving means to perform the determination.

16. An image-shake compensation apparatus according to claim 1, wherein said determination means includes means for inputting a driving signal to said driving means, said driving signal reciprocating said movable means for the determination.

17. An image-shake compensation apparatus according to claim 16, wherein said determination means includes means for inputting a driving signal to said driving means, said driving signal operating said movable means at a substantially natural frequency of said movable means for the determination.

18. An image-shake compensation apparatus according to claim 16, wherein said determination means includes means for inputting a driving signal to said driving means, said driving signal operating said movable means at a frequency lower than the natural frequency of said movable means for the determination.

19. An image-shake compensation apparatus according to claim 1, wherein said movable means includes an optical member.

20. An image-shake compensation apparatus according to claim 1, wherein said movable means includes means for deflecting optical flux when operating.

21. An image-shake compensation apparatus according to claim 1, wherein the electrically conductive section includes a coil.

22. An image-shake compensation method comprising the steps of:

moving a movable unit for image shake-compensation;

driving the movable unit by a driving unit; and determining whether the driving unit is in condition to drive said movable means, wherein the determining step includes inputting a predetermined driving signal to the driving unit for operating the driving unit, and concurrently, detecting a prescribed electromotive force induced on an electrically conductive section which is disposed in a magnetic flux and which generates a displacement relative to the magnetic flux due to movement of the movable unit to perform the determination.

23. An image-shake compensation apparatus comprising:

an optical unit for image-shake compensation;

driving means for driving said optical unit in accordance with a driving signal;

an electrically-conductive member disposed in a magnetic flux, wherein said electrically-conductive member induces an electromotive power when said optical unit is driven by said driving means; and judgement means for judging whether or not said optical unit is driven by detecting the electromotive power.

24. Apparatus according to claim 23, wherein said electrically-conductive member is disposed on said optical unit.

25. Apparatus according to claim 23, wherein said driving means has another electrically-conductive member and a magnet, and wherein said driving means drives said optical unit by an electromagnetic power which is generated by said another electrically-conductive member and magnet.

26. Apparatus according to claim 23, further comprising a magnet member which generates the magnetic flux.

27. Apparatus according to claim 26, wherein said judgment means has a judgment mode for executing judgment and a driving mode for driving said optical unit according to the electromagnetic power which is generated by said magnet member and said electrically-conductive member in accordance with the driving signal.

* * * * *